(12) United States Patent
Pu

(10) Patent No.: US 12,455,987 B2
(45) Date of Patent: Oct. 28, 2025

(54) PERMISSION OPTIMIZATION METHOD AND RELATED DEVICE

(71) Applicant: HONOR DEVICE CO., LTD., Shenzhen (CN)

(72) Inventor: Xing Pu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/017,722

(22) PCT Filed: Aug. 10, 2022

(86) PCT No.: PCT/CN2022/111361
§ 371 (c)(1),
(2) Date: Jan. 24, 2023

(87) PCT Pub. No.: WO2023/016479
PCT Pub. Date: Feb. 16, 2023

(65) Prior Publication Data
US 2024/0193306 A1    Jun. 13, 2024

(30) Foreign Application Priority Data
Aug. 12, 2021 (CN) .......................... 202110928256.9

(51) Int. Cl.
*G06F 21/62* (2013.01)
(52) U.S. Cl.
CPC ........ *G06F 21/629* (2013.01); *G06F 21/6245* (2013.01)

(58) Field of Classification Search
CPC .............. G06F 21/629; G06F 21/6245; G06F 2221/034; G06F 2221/2141; G06F 21/577; G06F 21/552
See application file for complete search history.

(56) References Cited

U.S. PATENT DOCUMENTS

| 8,265,595 B1 | 9/2012 | Reeves et al. |
| 2006/0141985 A1* | 6/2006 | Patel ...................... H04M 3/38  455/410 |
| 2008/0028461 A1 | 1/2008 | Pouliot |
| 2010/0191691 A1 | 7/2010 | Hudson, Jr. |

(Continued)

FOREIGN PATENT DOCUMENTS

| CN | 104346566 A | 2/2015 |
| CN | 104462961 A | 3/2015 |

(Continued)

OTHER PUBLICATIONS

Qu Yiting et al; "Automatic Permission Optimization Framework for Privacy Enhancement of Mobile Applications"; IEEE Internet of Things Journal, IEEE, USA, Nov. 25, 2020, pp. 7394-7406.

*Primary Examiner* — Benjamin E Lanier
*Assistant Examiner* — Felicia Farrow
(74) *Attorney, Agent, or Firm* — WOMBLE BOND DICKINSON (US) LLP

(57) ABSTRACT

An electronic device may determine, based on a permission access record of an application, whether a privacy risk exists. If the privacy risk exists, the electronic device may remind and guide a user to perform permission optimization, which reduces a risk of user privacy disclosure and improves user experience.

20 Claims, 36 Drawing Sheets

(56) References Cited

U.S. PATENT DOCUMENTS

| | | | |
|---|---|---|---|
| 2015/0339482 A1* | 11/2015 | Wurster | H04W 12/08 726/30 |
| 2016/0234218 A1* | 8/2016 | Liu | H04L 63/107 |
| 2021/0390171 A1* | 12/2021 | Yuan | G06F 9/451 |
| 2022/0188433 A1* | 6/2022 | Hung | G06F 21/51 |
| 2022/0309187 A1* | 9/2022 | Song | G06F 21/6281 |
| 2024/0193306 A1 | 6/2024 | Pu | |

FOREIGN PATENT DOCUMENTS

| | | | | |
|---|---|---|---|---|
| CN | 105072255 A | | 11/2015 | |
| CN | 106529270 A | | 3/2017 | |
| CN | 107133527 A | | 9/2017 | |
| CN | 108537011 A | | 9/2018 | |
| CN | 108710795 A | | 10/2018 | |
| CN | 109241769 A | | 1/2019 | |
| CN | 109257391 A | | 1/2019 | |
| CN | 109815712 A | | 5/2019 | |
| CN | 110287694 A | | 9/2019 | |
| CN | 110336910 A | | 10/2019 | |
| CN | 111339049 A | | 6/2020 | |
| CN | 111382418 A | | 7/2020 | |
| CN | 112352239 A | | 2/2021 | |
| CN | 112685723 A | | 4/2021 | |
| CN | 112765591 A | * | 5/2021 | G06F 11/3476 |
| CN | 113094670 A | | 7/2021 | |
| CN | 113792329 A | | 12/2021 | |
| CN | 115630388 A | | 1/2023 | |
| CN | 116484416 A | | 7/2023 | |
| EP | 3859576 A1 | | 8/2021 | |

* cited by examiner

PERMISSION OPTIMIZATION METHOD AND RELATED DEVICE

CROSS-REFERENCE TO RELATED APPLICATIONS

This application is a National Stage of International Application No. PCT/CN2022/111361, filed Aug. 10, 2022, which claims priority to Chinese Patent Application No. 202110928256.9, filed Aug. 12, 2021, both of which are hereby incorporated by reference in their entireties.

TECHNICAL FIELD

This application relates to the field of terminal technologies, and in particular, to a permission optimization method and a related device.

BACKGROUND

Currently, when using an electronic device such as a mobile phone, a user usually needs to grant some permissions to an application to complete a corresponding task. For example, when sending a photo in a gallery by using a specific social application, the user needs to grant a gallery permission to the application, thereby completing a photo sending task.

However, the user cannot view whether the application abnormally uses a granted permission to obtain privacy information of the user, and cannot perform permission optimization. This may easily lead to a risk of user privacy disclosure and poor user experience.

SUMMARY

Embodiments of this application provide a permission optimization method and a related device, to optimize permission of an application in which a privacy risk exists, reduce a risk of user privacy disclosure, and improve user experience.

According to a first aspect, an embodiment of this application provides a permission optimization method, applied to an electronic device. The method includes: displaying, by the electronic device, a permission access record of a first application, where the permission access record includes an access record in which a privacy risk exists, and the access record in which a privacy risk exists includes one or more of the following: a record in which the first application is used by the first application when a specific function of the first application is disabled, and a record in which a second permission is used by the first application, and the second permission is not a permission allowed to be granted to the first application: detecting, by the electronic device, a permission optimization operation of a user: and performing, by the electronic device, one or more of the following operations: allowing the first application to use the first permission only when the specific function is enabled, and prohibiting the first application from using the second permission.

The embodiment of this application provides the permission optimization method. The electronic device can optimize permission of an application in which a privacy risk exists, which reduces a risk of user privacy disclosure, and improves user experience.

In a possible implementation, the permission access record further includes the access record in which no privacy risk exists. Before the electronic device detects the permission optimization operation of the user, a display manner of the access record in which no privacy risk exists is different from a display manner of the access record in which a privacy risk exists. After the electronic device detects the permission optimization operation of the user, a display manner of the access record in which no privacy risk exists is the same as a display manner of the access record in which a privacy risk exists.

In this way, before the permission optimization, display manners are different, so that the user can distinguish between the access record in which a privacy risk exists and the access record in which no privacy risk exists. After the permission optimization, display manners are the same, so that the user may be reminded that the permission optimization is completed.

In a possible implementation, before the displaying, by the electronic device, the first permission access record interface, the method further includes: displaying, by the electronic device, a first user interface, where the first user interface includes one or more permission options and one or more application program options, the one or more permission options are used by the user to view an application program that has used a permission, the one or more application program options are used by a user to view an access record of the permission corresponding to the application program, and the one or more application program options includes a first application program option: and detecting, by the electronic device, an operation performed by the user on the first application program option.

In this way, the user can be guided to perform optimization on a specific permission of a specific application.

In a possible implementation, the detecting, by the electronic device, a permission optimization operation of the user specifically includes a first operation and a second operation. The first operation is an operation that is detected by the electronic device and that is performed by the user on the access record in which a privacy risk exists. The second operation is an operation that is detected by the electronic device and that is performed by the user on a first option. The first option is displayed on a first window; and the first window is displayed after the electronic device detects the first operation.

In this way, the user can be guided to perform permission optimization step by step.

In a possible implementation, the first user interface further includes a second option, and the method further includes: detecting, by the electronic device, an operation performed by the user on the second option, and displaying, by the electronic device, a second user interface, where the second user interface includes all privacy access records, and all the privacy access records include records in which one or more applications have used/attempted to use one or more permissions.

In this way, the user can view a permission privacy access record.

In a possible implementation, all the privacy access records are distinctively displayed on the second user interface in chronological order.

In this way, a requirement that a user needs to view all the privacy access records at a specific time point can be met.

In a possible implementation, all the privacy access records are distinctively displayed on the second user interface based on a permission name.

In this way, a requirement that a user needs to view all the privacy access records of a specific permission can be met.

In a possible implementation, all the privacy access records are distinctively displayed on the second user interface based on an application name.

In this way, a requirement that a user needs to view all privacy access records of a specific application can be met.

In a possible implementation, the method further includes: detecting, by the electronic device, an operation performed by the user for viewing a privacy access record of the first application, and displaying, by the electronic device, a third user interface, where the third user interface includes a third option, and the third option is used by the user to view complete or partial permission access records of the first application.

In this way, the user can view a record in which a specific application has used or attempted to use all permissions or a specific permission.

In a possible implementation, the electronic device displays first prompt information, where the first prompt information is used to remind a user to view a permission access record.

In this way, the user can be reminded to view the permission access record.

According to a second aspect, an embodiment of this application provides a permission optimization method, applied to an electronic device. The method includes: displaying, by the electronic device, a fourth user interface, where the fourth user interface includes an abnormal use record of a first permission and an over-authorization record, the abnormal use record of the first permission includes a record in which the first permission is used by one or more applications when a specific function of the one or more applications is disabled, the over-authorization record includes a record in which the one or more applications are granted a second permission, and the second permission is not a permission allowed to be granted to the first application: detecting, by the electronic device, a permission optimization operation of a user: and performing, by the electronic device, one or more of the following operations: allowing, by the electronic device, the one or more applications to use the first permission only when the specific function of the one or more applications is enabled, and prohibiting, by the electronic device, the one or more applications from using the second permission.

In a possible implementation, before the displaying, by the electronic device, a fourth user interface, the method further includes: determining, by the electronic device, that the one or more applications abnormally use the first permission: and determining, by the electronic device, that the one or more applications are over-authorized.

In this way, after determining that the one or more applications abnormally use the first permission and the one or more applications are over-authorized, the electronic device may display the abnormal use record of the first permission and the over-authorization record.

In a possible implementation, the determining, by the electronic device, that the one or more applications abnormally use the first permission specifically includes: detecting, by the electronic device, that a quantity of times that the one or more applications use the first permission to obtain user privacy information within a first preset time period exceeds a first preset threshold; and/or, detecting, by the electronic device, that the one or more applications use the first permission when the specific function is disabled.

In this way, the electronic device may determine, based on behavior of an application, whether the application uses the first permission abnormally.

In a possible implementation, the determining, by the electronic device, that the one or more applications are over-authorized specifically includes: detecting, by the electronic device, that the one or more applications are granted a second permission: and determining, by the electronic device, that the second permission is not a permission allowed to be granted to the one or more applications in a preset rule.

In this way, the electronic device may determine whether the application is over-authorized by presetting a rule.

In a possible implementation, the fourth user interface further includes a fourth option, and the detecting, by the electronic device, a permission optimization operation of the user specifically includes: detecting, by the electronic device, an operation performed by the user on the fourth option.

In this way, the electronic device may complete permission optimization on all permissions of all applications at a time through a "one-tap optimization" operation performed by the user.

In a possible implementation, the detecting, by the electronic device, a permission optimization operation of the user specifically includes a third operation and a fourth operation. The third operation includes an operation performed by the user on the abnormal use record of the first permission and an operation performed by the user for modifying the first permission. The fourth operation includes an operation performed by the user on the over-authorization record and an operation performed by the user for modifying the second permission.

In this way, the user can individually perform permission optimization on a specific permission of a specific application.

In a possible implementation, the method further includes: displaying, by the electronic device, second prompt information, where the second prompt information is used to remind the user that the electronic device has completed permission optimization.

In this way, the user can be reminded to complete permission optimization.

According to a third aspect, an embodiment of this application provides an electronic device, where the electronic device includes one or more processors and one or more memories. The one or more memories are coupled to the one or more processors. The one or more memories are configured to store computer program code. The computer program code includes computer instructions. When the one or more processors execute the computer instructions, the electronic device is enabled to perform the method according to any one of the first aspect or the second aspect or the possible implementations of the first aspect or the second aspect.

According to a fourth aspect, an embodiment of this application provides a computer storage medium. The computer storage medium stores a computer program, and the computer program includes program instructions. When the program instructions are run on an electronic device, the electronic device is enabled to perform the method according to any one of the first aspect or the second aspect or the possible implementations of the first aspect or the second aspect.

According to a fifth aspect, an embodiment of this application provides a computer program product. When the computer program product runs on a computer, the computer is enabled to perform the method according to any one of the first aspect or the second aspect or the possible implementations of the first aspect or the second aspect.

DESCRIPTION OF EMBODIMENTS

Figure 1A:
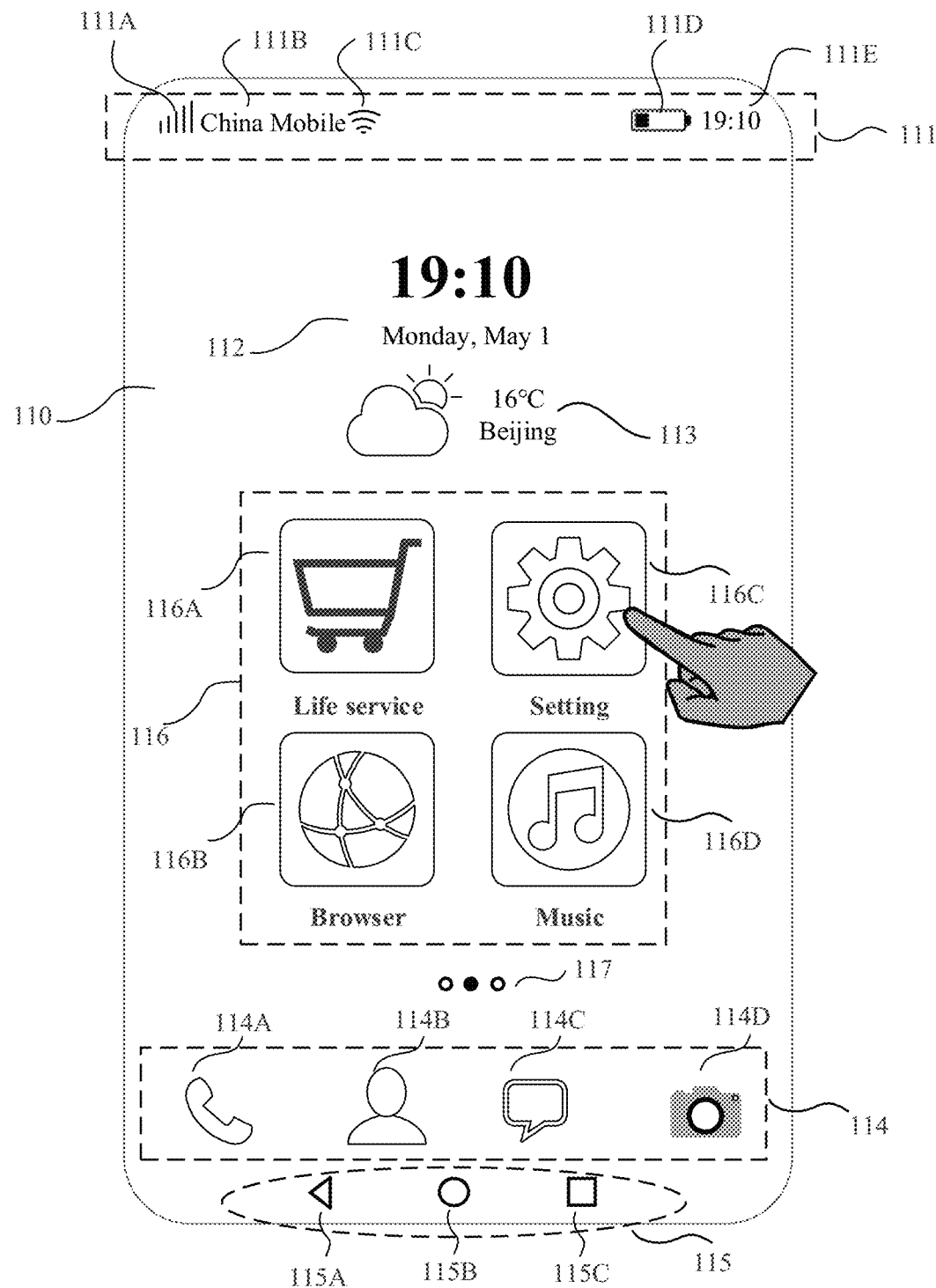
FIG. 1A-FIG. 1D are schematic diagrams of a group of user interfaces according to an embodiment of this application.

Technical solutions in embodiments of this application are clearly and completely described below with reference to accompanying drawings in embodiments of this application. In descriptions of embodiments of this application, unless otherwise stated, "/" indicates or, for example, A/B may indicate A or B. "And/or" in the text is merely an association relationship that describes an associated object, and indicates that three relationships may exist. For example, A and/or B may indicate that there are three cases: only A exists, both A and B exist, and only B exists. In addition, in the descriptions of embodiments of this application, "a plurality of" means two or more.

It should be understood that the terms "first" and "second" in the specification, claims, and accompanying drawings of this application are used to distinguish different objects, and are not used to describe a specific sequence. In addition, the terms "include" and "have" and any variations thereof are intended to cover non-exclusive inclusion. For example, a process, method, system, product, or device that includes a series of steps or units is not limited to a listed step or unit, but optionally further includes an unlisted step or unit, or optionally further includes another step or unit inherent to the process, method, product, or device.

In this application, referring to "an embodiment" means that specific features, structures or features described with reference to the embodiment may be included in at least one embodiment of this application. The phrase appearing at various locations in the specification does not necessarily refer to a same embodiment, nor is it a separate or alternative embodiment mutually exclusive with another embodiment. A person skilled in the art explicitly and implicitly understands that the described embodiments in this application may be combined with another embodiment.

Currently, when using an electronic device such as a mobile phone, a user usually needs to grant some permissions to an application (or referred to as an application) to complete a corresponding task. For example, when sending a photo in a gallery by using a specific social application, the user needs to grant a gallery permission to the application, thereby completing a photo sending task.

However, the user cannot view whether the application abnormally uses a granted permission to obtain privacy information of the user, and cannot perform permission optimization. This may easily lead to a risk of user privacy disclosure and poor user experience.

An embodiment of this application provides a permission optimization method. The electronic device may determine, based on a permission access record of an application, whether a privacy risk exists. If the privacy risk exists, the electronic device may remind and guide a user to perform permission optimization, which reduces a risk of user privacy disclosure and improves user experience.

The electronic device in this embodiment of this application may be a mobile phone, a tablet computer, a wearable device, an on-board equipment, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or the like. A specific type of the electronic device is not limited in this embodiment of this application.

An example of a user interface (user interface, UI) provided by an electronic device 100 is described below.

The term "user interface" in the specification, claims, and accompanying drawings of this application is a media interface for an interaction and information exchange between an application or an operating system and a user. The media interface implements an information conversion between an internal form and a form acceptable to the user. A common form of expression of the user interface is a graphic user interface (graphic user interface, GUI), which is a user interface that is displayed in a graphical manner and that is related to a computer operation. The graphic user interface may be an interface element such as an icon, a window; or a control that is displayed on a display of an electronic device. The control may include visible interface elements such as an icon, a button, a menu, a tab, a text box, a dialog box, a status bar, a navigation bar, and a Widget.

FIG. 1A shows an example of a user interface 110 on the electronic device 100 for displaying an application installed on the electronic device 100.

The user interface 110 may include: a status bar 111, a calendar indicator 112, a weather indicator 113, a tray 114 with an icon of a common application, a navigation bar 115, a combination 116 of other application icons, and the like.

The status bar 111 may include one or more signal strength indicators 111A of a mobile communication signal (also referred to as a cellular signal), an operator name (such as "China Mobile") 111B, one or more signal strength indicators 111C of a wireless fidelity (wireless fidelity, Wi-Fi) signal, a battery status indicator 111D, and a time indicator 111E.

The calendar indicator 112 may be used to indicate current time, such as a date, a day of a week, and hour and minute information.

The weather indicator 113 may be used to indicate a weather type, for example, cloudy to sunny, or light rain, and may be further used to indicate information such as a temperature.

The tray 114 with an icon of a common application may display: a call icon 114A, a contact icon 114B, an SMS icon 114C, and a camera icon 114D.

The navigation bar 115 may include system navigation keys such as a return key 115A, a home screen key 115B, and a multi-task key 115C. When it is detected that the user taps the return key 115A, the electronic device 100 may display a previous page of a current page. When it is detected that the user taps the home screen key 115B, the electronic device 100 may display a home screen. When it is detected that the user taps the multi-task key 115C, the electronic device 100 may display tasks recently opened by the user. Each navigation key may have another name, which is not limited in this application. Each navigation key in the navigation bar 115 may alternatively be implemented as a physical key in addition to a virtual key.

The combination 116 of other application icons may include one or more other application icons, such as a life service icon 116A, a browser icon 116B, a setting icon 116C, and a music icon 116D. The user interface 110 may further include a page indicator 117. Other application icons may be distributed on a plurality of pages. The page indicator 117 may be used to indicate an application that is currently browsed by the user and that is in a page. The user may slide an area of other application icons left or right to browse application icons in other pages.

In some embodiments, the user interface 110 shown in an example in FIG. 1A may be a home screen (Home screen).

In some other embodiments, the electronic device 100 may further include a physical home screen key. The home screen key may be used to receive an instruction of the user, and return a currently displayed UI to the home screen, so that the user can view the home screen at any time. The instruction may be specifically an operation instruction in which the user taps the home screen key for a single time, an operation instruction in which the user taps the home screen key twice in a short time, or an operation instruction in which the user taps the home screen key for a long time within a predetermined time. In some other embodiments of this application, the home screen key may further be integrated with a fingerprint sensor, so that when the home screen key is tapped, fingerprint collection and identification are subsequently performed.

It may be understood that FIG. 1A shows only an example of a user interface on the electronic device 100, which should not constitute a limitation on this embodiment of this application.

Figure 1B:
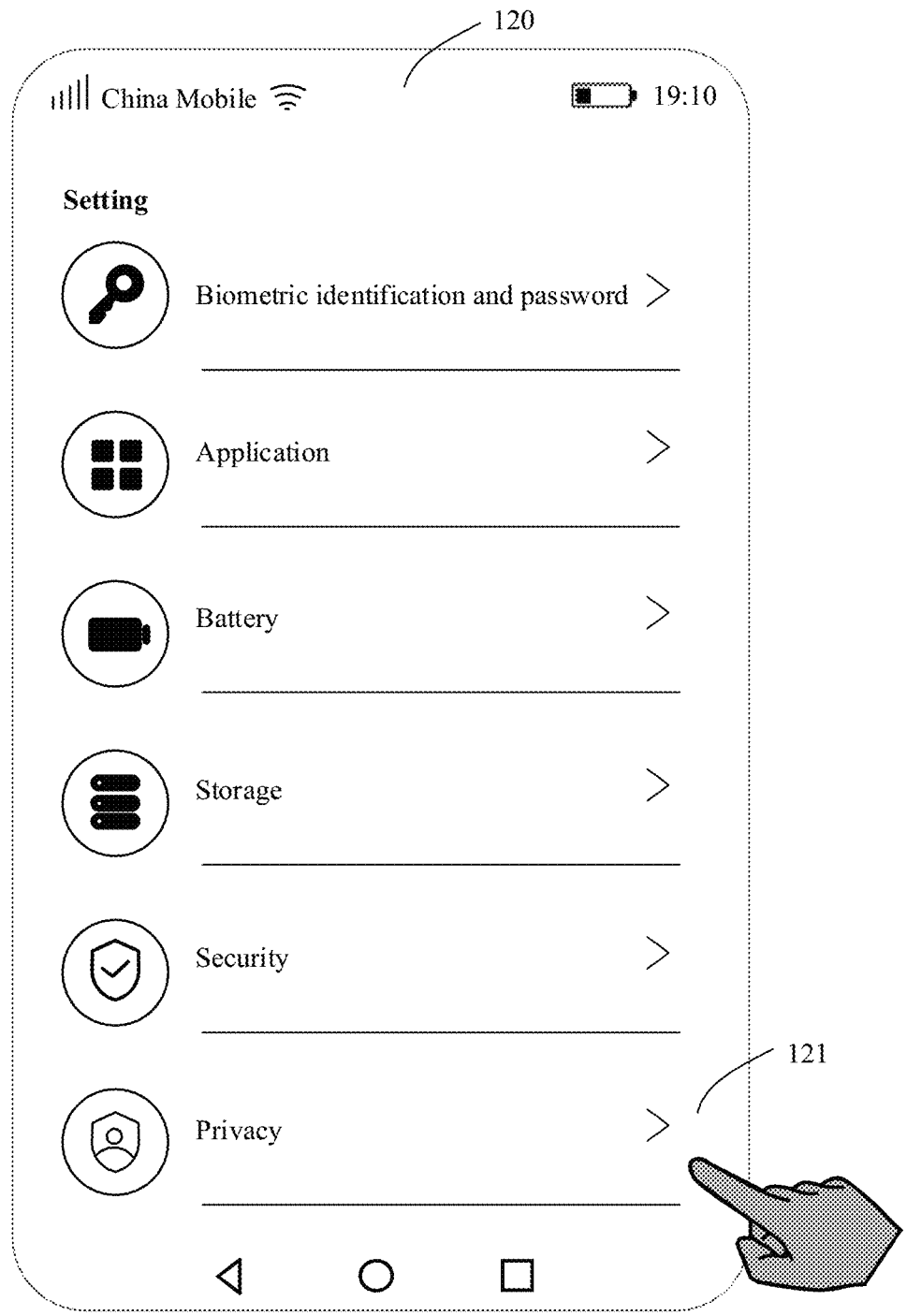

As shown in FIG. 1A, the electronic device 100 may detect an operation used to open a "setting" application (such as a tap operation on the setting icon 116C): and in response to the operation, the electronic device 100 may display a user interface 120 of the setting application shown in an example in FIG. 1B.

As shown in FIG. 1B, a plurality of setting options may be displayed on the user interface 120, such as a biometric identification and password setting option, an application setting option, a battery setting option, a storage setting option, a security setting option, and a privacy setting option 121. The electronic device 100 may detect an operation (such as a tap operation) performed by the user on the privacy setting option 121: and in response to the operation, the electronic device 100 may display a user interface 130 shown in an example in FIG. 1C.

Figure 1C:
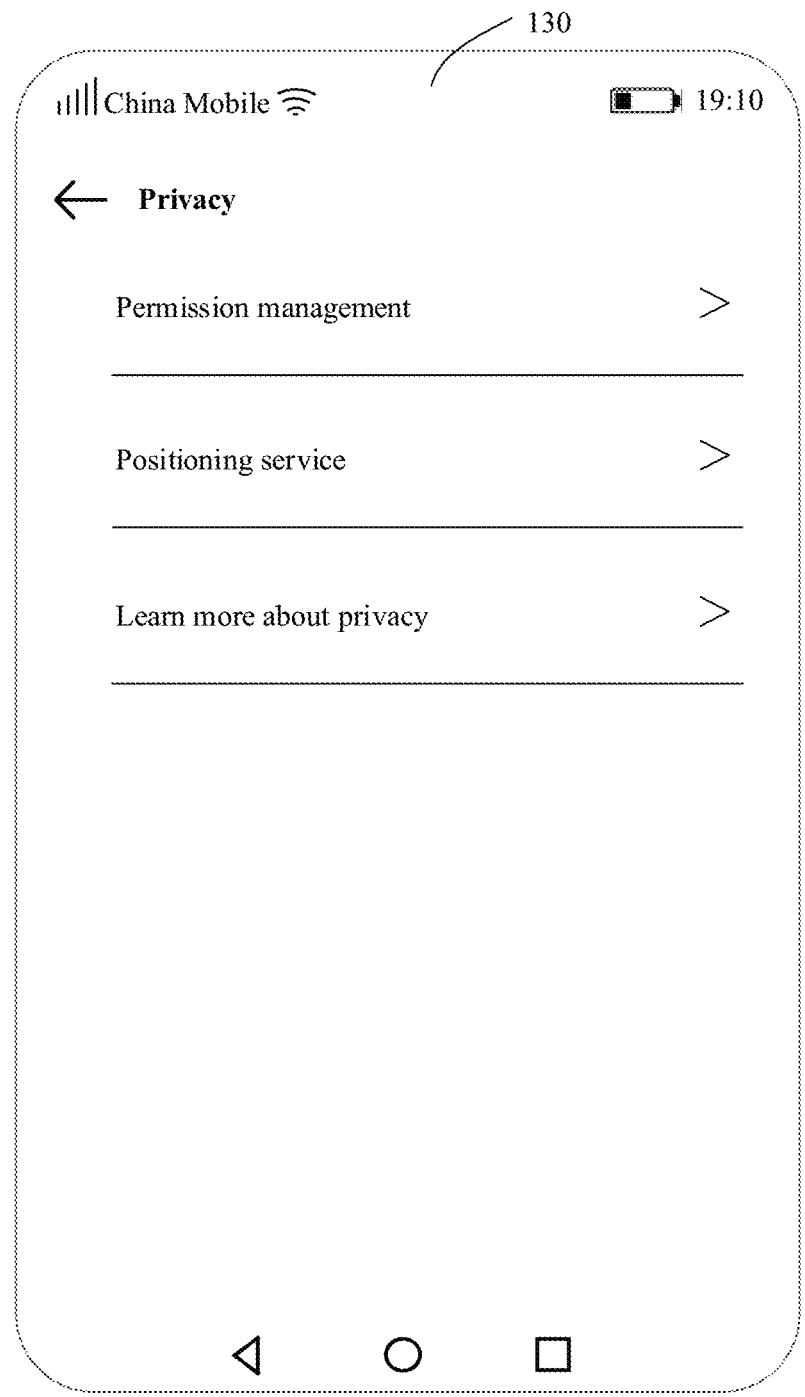

As shown in FIG. 1C, a plurality of options for setting privacy may be displayed on the user interface 130, such as a permission management option, a positioning service option, and an option of learning more privacy functions.

However, these options on the user interface 130 cannot provide the user with functions of viewing a privacy access record of an application and optimizing a permission. Therefore, the user cannot view whether the application abnormally uses a granted permission to obtain privacy information of the user, and cannot perform permission optimization. This may easily lead to a risk of user privacy disclosure and poor user experience.

An embodiment of this application provides a permission optimization method. The electronic device 100 may determine, based on a permission access record of an application, whether a privacy risk exists. If the privacy risk exists, the electronic device 100 may remind and guide a user to perform permission optimization, which reduces user privacy disclosure and improves user experience.

A series of user interfaces in the permission optimization method provided in the embodiments of this application are described below in detail.

Figure 1D:
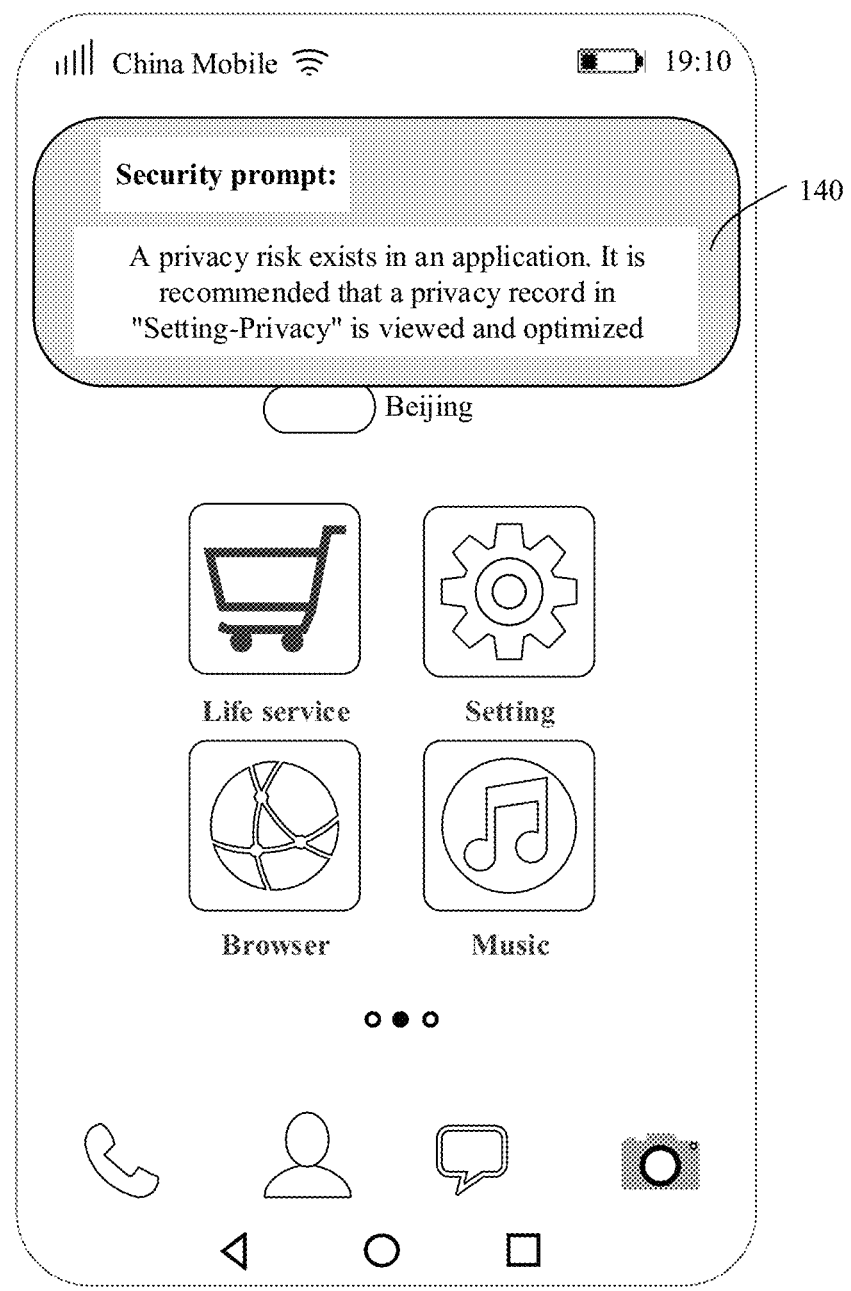

In a case of an application in which a privacy risk exists, the electronic device 100 may display a pop-up interface 140 shown in an example in FIG. 1D. Security prompt information is displayed on the pop-up interface 140. The security prompt information is used to remind the user that a privacy risk exists in the application, and advise the user to view a privacy record in "setting-privacy" and perform optimization.

Figure 2A:
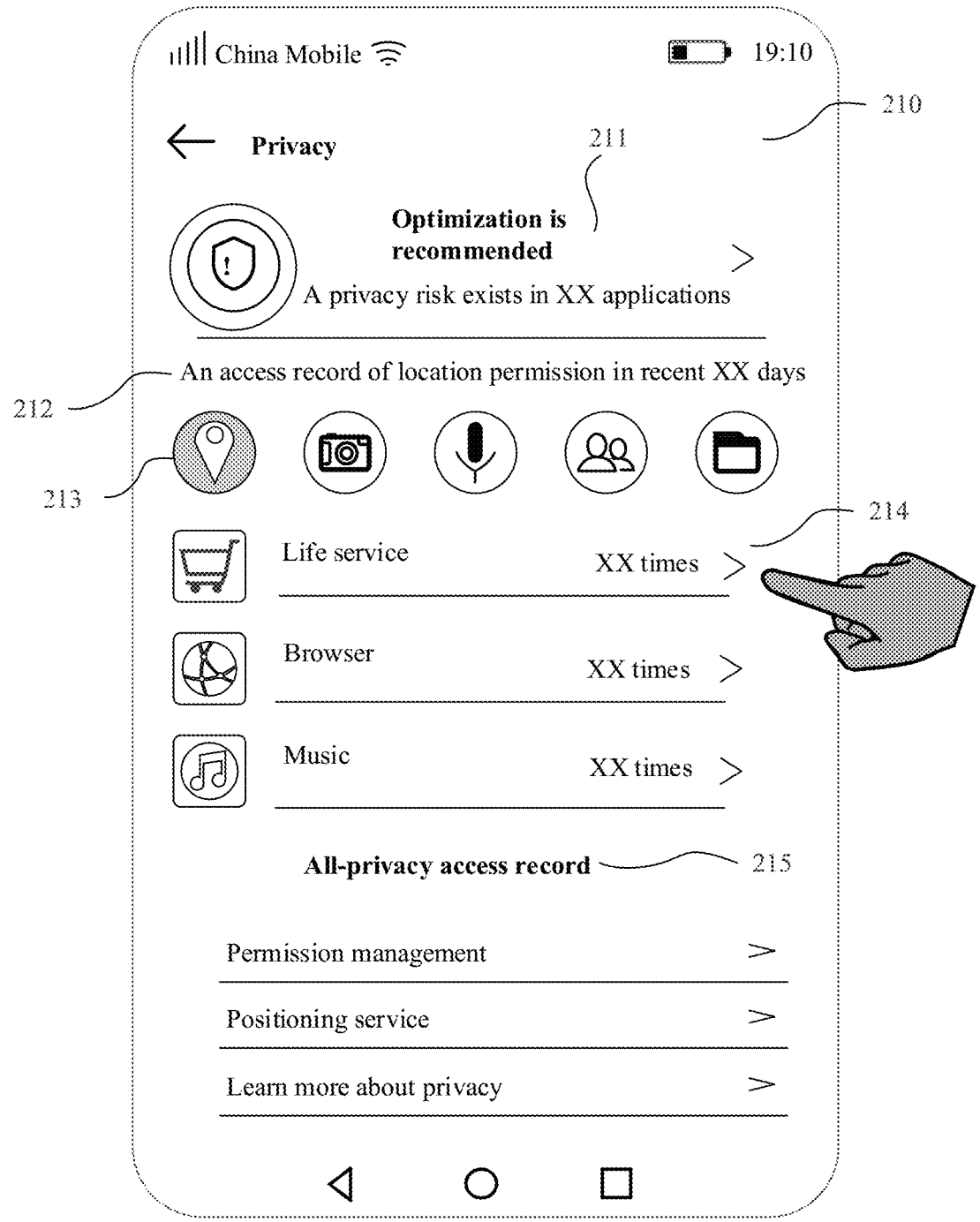
FIG. 2A-FIG. 2E are schematic diagrams of another group of user interfaces according to an embodiment of this application.

As shown in FIG. 1B, the electronic device 100 may detect an operation performed by the user on the privacy setting option 121 (such as a tap operation): and in response to the operation, the electronic device 100 may display a user interface 210 of the privacy setting option 121 shown in an example in FIG. 2A.

FIG. 2A-FIG. 2E show an example of a group of user interfaces on which the electronic device 100 guides the user to perform permission optimization.

FIG. 2A shows an example of a user interface 210 of the privacy setting option 121.

As shown in FIG. 2A, an option 211, indication information 212, one or more permission setting options (such as a location permission setting option 213, a camera permission setting option, a recording permission setting option, an address book permission setting option, and a storage permission setting option), one or more application options (such as a life service application option 214, a browser application option, and a music application option), an all-privacy access record option 215, a permission management option, a positioning service option, an option of learning more privacy functions, and the like may be displayed on the user interface 210.

A permission corresponding to the permission setting option may be a permission with a relatively large total quantity of times of use by all applications in the electronic device 100, and the permission setting option may be arranged in descending order of the total quantity of use times of the permission. For example, five permission setting options are displayed on the user interface 210, and are successively a location permission setting option 213, a camera permission setting option, a recording permission setting option, an address book permission setting option, and a storage permission setting option. Therefore, a location permission is a permission with the largest total quantity of times of use by all applications in the electronic device 100: a camera permission is a permission with the second largest total quantity of times of use by all applications in the electronic device 100; and by analogy, a storage permission is a permission with the smallest total quantity of times of use by all applications in the electronic device 100.

Still referring to FIG. 2A, it can be learned that the location permission setting option 213 is in a selected state. In this case, applications corresponding to a plurality of application options are applications that have used the location permission. The indication information 212 is used to indicate that a current access record is a record of an application accessing the location permission in recent XX days.

The application option may be arranged in descending order of a total quantity of times of using a specific permission by an application in recent XX days (for example, recent 7 days). For example, three application options are displayed on the user interface 210, and are successively a life service application option 214, a browser application option and a music application option. Therefore, the life service application is an application with the largest total quantity of times of using the location permission in recent XX days: a browser application is an application with the second largest total quantity of times of using the location permission in recent XX days: and a music application is an application with the smallest total quantity of times of using the location permission in recent XX days.

Figure 2B:
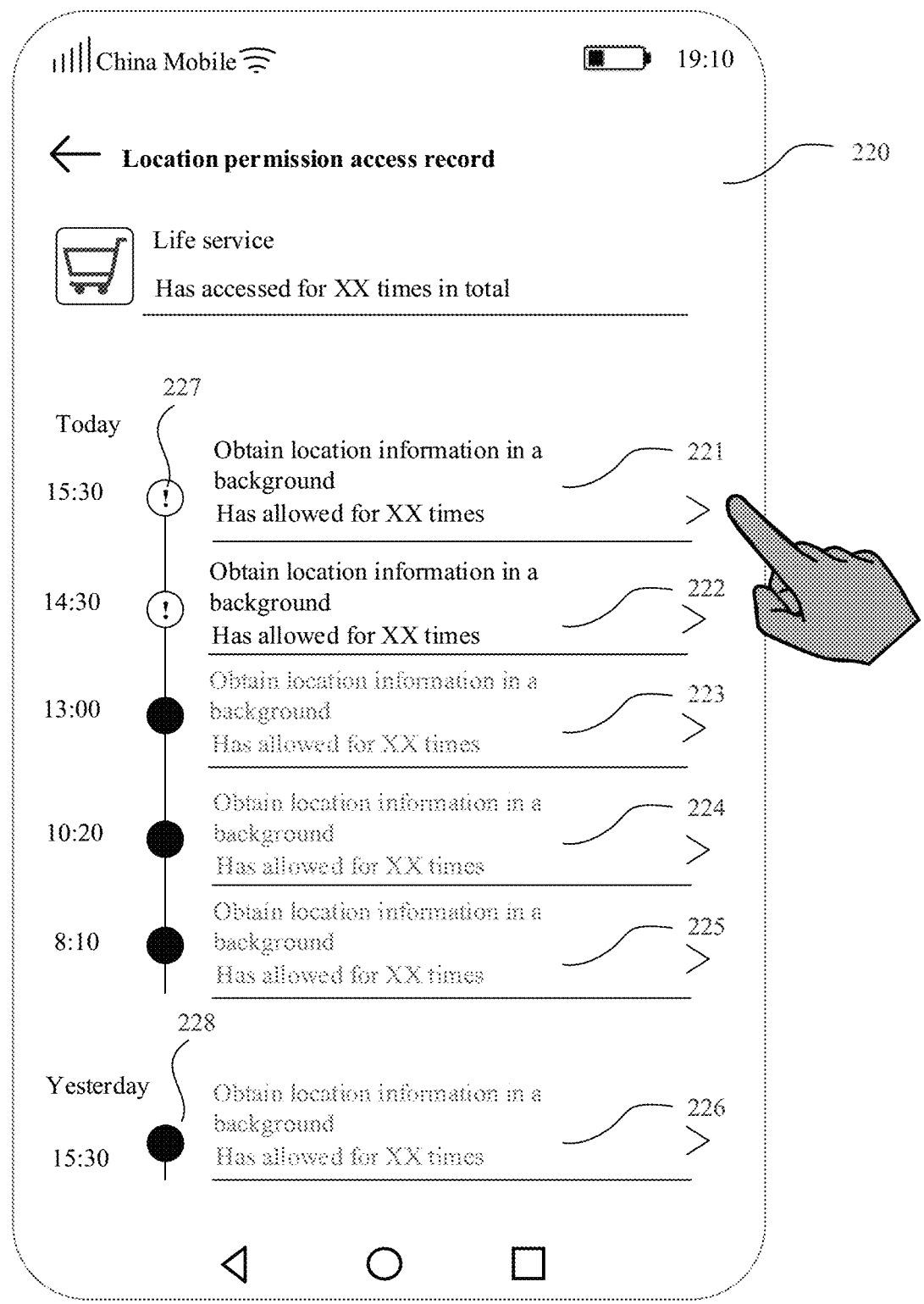

Still referring to FIG. 2A, the electronic device 100 may detect an operation (such as a tap operation) performed by the user on the life service application option 214: and in response to the operation, the electronic device 100 may display a user interface 220 shown in an example in FIG. 2B.

FIG. 2B shows an example of a user interface 220 of a record of the life service application accessing the location permission in recent XX days.

As shown in FIG. 2B, it can be learned that the life service application accesses the location permission for XX times in total, that is, the life service application obtains location information in a background for XX times by using the location permission in recent XX days.

Still referring to FIG. 2B, a location permission access list may be displayed on the user interface 220. The location permission access list may include one or more location permission access records, such as a location permission access record 221, a location permission access record 222, a location permission access record 223, a location permission access record 224, a location permission access record 225, and a location permission access record 226. The one or more location permission access records may display a time point when the life service application is allowed to use the location permission and a quantity of times that the life service application obtains location information in the background. For example, it can be learned from the location permission access record 221 that, at 15:30 this afternoon, the life service application is allowed to use the location permission to obtain the location information in the background for XX times.

Still referring to FIG. 2B, the location permission access list may include a permission access record in which a privacy risk exists and/or a permission access record in which no privacy risk exists. A display manner of the permission access record in which a privacy risk exists may be different from a display manner of the permission access record in which no privacy risk exists, so that the user can distinguish these two types of permission access records.

For example, a font color of the permission access record in which a privacy risk exists may be different from a font color of the permission access record in which no privacy risk exists. For example, as shown in FIG. 2B, a permission access record with a dark font color may indicate the permission access record in which a privacy risk exists (such as the location permission access record 221 and the location permission access record 222), and a permission access record with a light font color may indicate the permission access record in which no privacy risk exists (such as the location permission access record 223, the location permission access record 224, the location permission access record 225, and the location permission access record 226).

Optionally, for permission access records with privacy risks at different levels, font colors may alternatively be different. For example, a font color of a permission access record with a high privacy risk may be darker than a font color of a permission access record with a low privacy risk.

Optionally, different styles of risk icons may further be used to distinguish between the permission access record in which a privacy risk exists and the permission access record in which no privacy risk exists. For example, a risk icon 227 may be used to indicate that a privacy risk exists in the permission access record, and a risk icon 228 may be used to indicate that no privacy risk exists in the permission access record.

It should be noted that a display manner used to distinguish the two types of permission access records is not limited to a font color and a style of a risk icon, and may further be a font size, a background color, and the like. This is not limited herein.

Figure 2C:
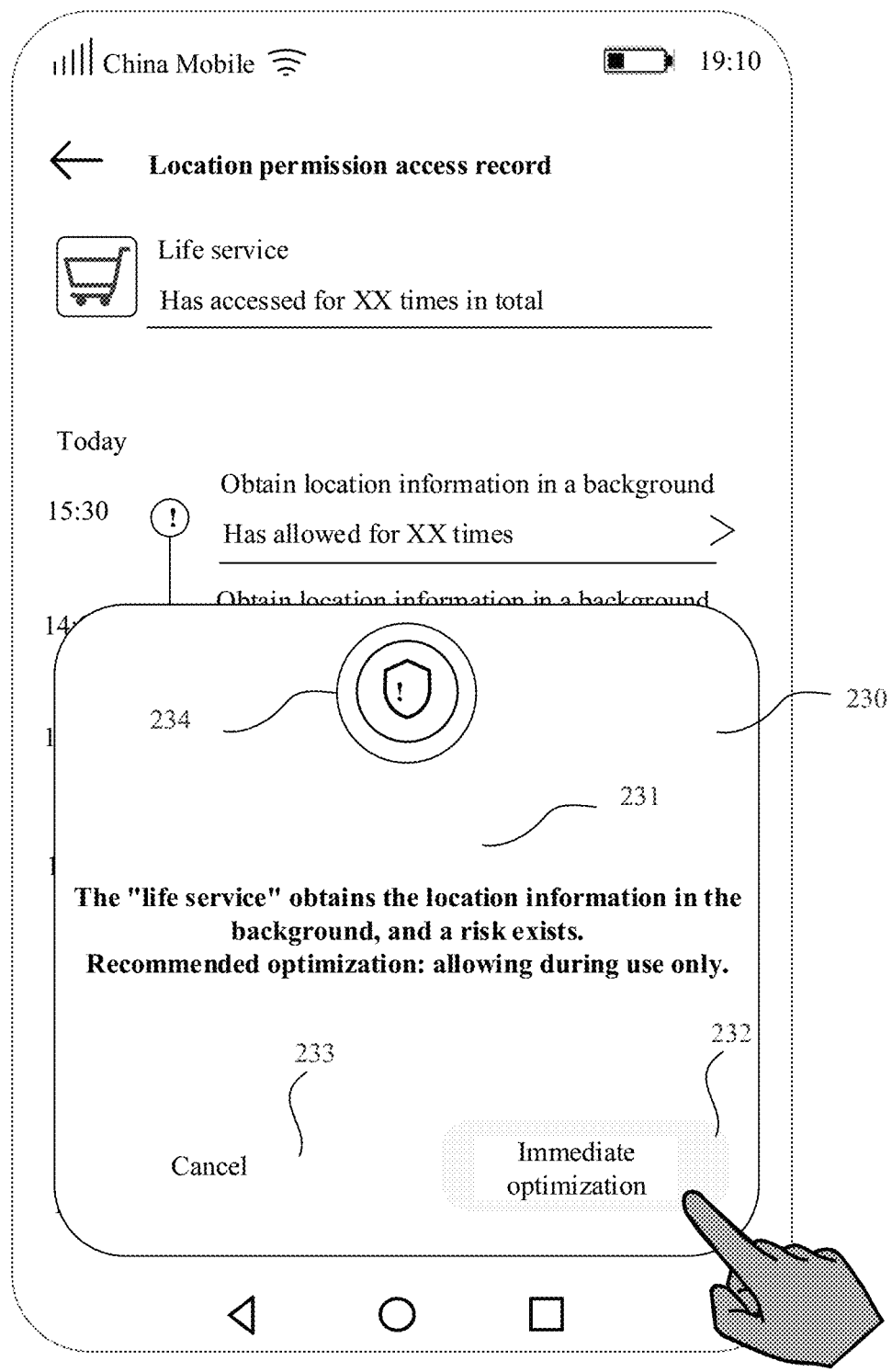

Still referring to FIG. 2B, the electronic device 100 may detect an operation (such as a tap operation) performed by the user on the location permission access record 221: and in response to the operation, the electronic device 100 may display a pop-up interface 230 shown in an example in FIG. 2C.

As shown in FIG. 2C, prompt information 231, an "immediate optimization" option 232, and a "cancel" option 233 may be displayed on the pop-up interface 230. The prompt information 231 may be used to remind the user that an application obtains location information in the background and a risk may exists, and advise the user to perform permission optimization. For example, an authorization manner of the location permission of the current life service application may be set to "always allowing", so that the electronic device 100 may advise the user to set an authorization manner of the location permission to "allowing during use only" by using the prompt information 231.

Optionally, the "immediate optimization" option 232 may have a background color to indicate that the electronic device 100 recommends/advises the user to perform permission optimization.

Optionally, an icon 234 may further be displayed on the pop-up interface 230, which is used to indicate that a privacy risk exists.

Still referring to FIG. 2C, for example, if the electronic device 100 detects an operation (such as a tap operation) performed by the user on the "cancel" option 233, in response to the operation, the electronic device 100 may not perform permission optimization, and returns to display the user interface 220 shown in FIG. 2B. For example, if the electronic device 100 detects an operation (such as a tap operation) performed by the user on the "immediate optimization" option 232, in response to the operation, the electronic device 100 may set the location permission of the life service application to "allowing during use only", that is, the life service application is allowed to use the location permission only when the user is using the life service application. In addition, the electronic device 100 may display a user interface 240 shown in an example in FIG. 2D.

Figure 2D:
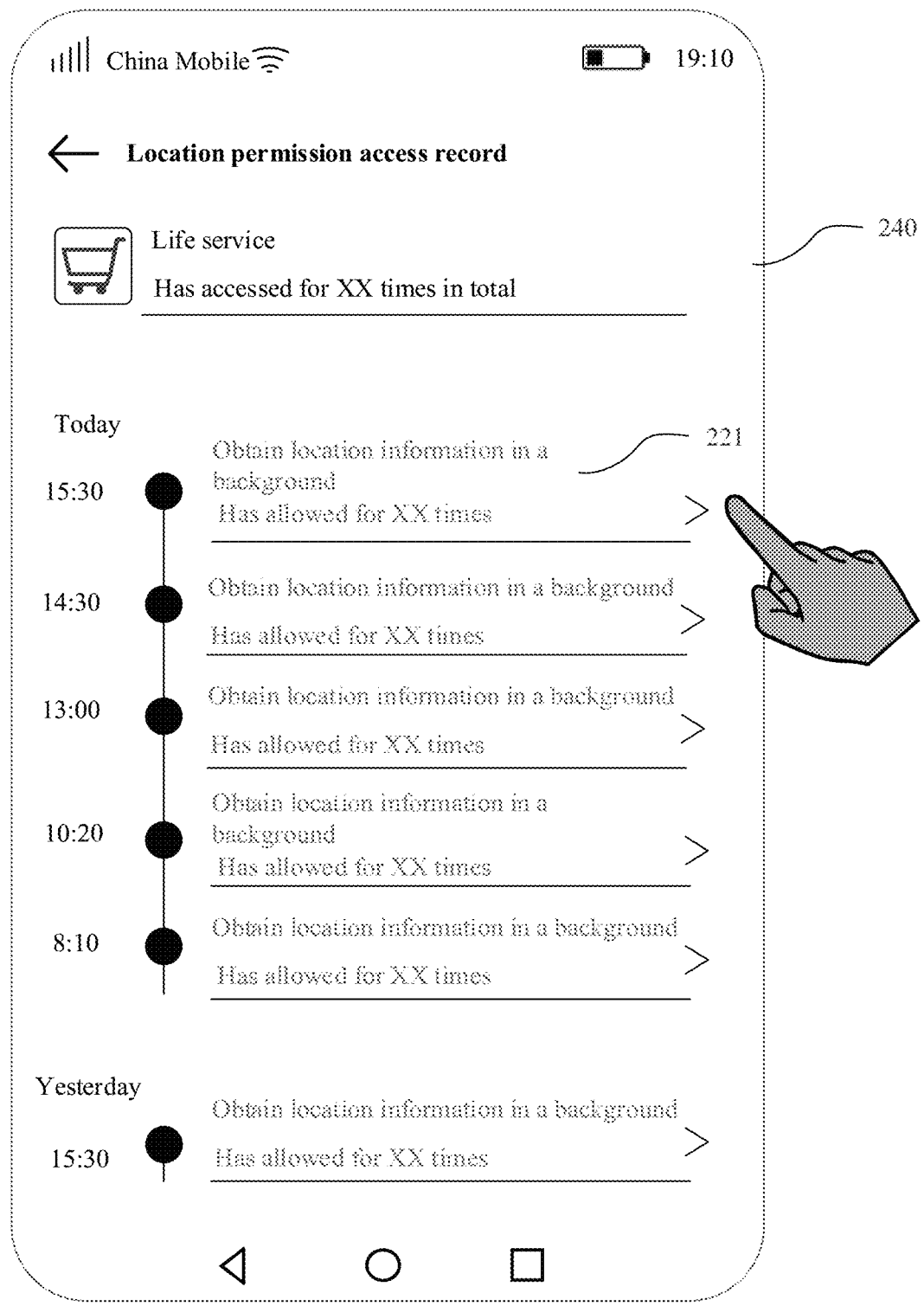

As shown in FIG. 2D, it can be learned that, compared with display manners of all location permission access records in FIG. 2B, display manners of all location permission access records in FIG. 2D are the same, that is, the electronic device 100 adjusts the display manner of the permission access record in which a privacy risk exists and the display manner of the permission access record in which no privacy risk exists that are shown in FIG. 2B to a same display manner. For example, a font color of the location permission access record 221 is adjusted from dark to light, and a corresponding risk icon is adjusted from the risk icon 227 to the risk icon 228. In this way, all location permission access records are displayed in a same manner, which may indicate that the electronic device 100 completes location permission optimization.

Figure 2E:
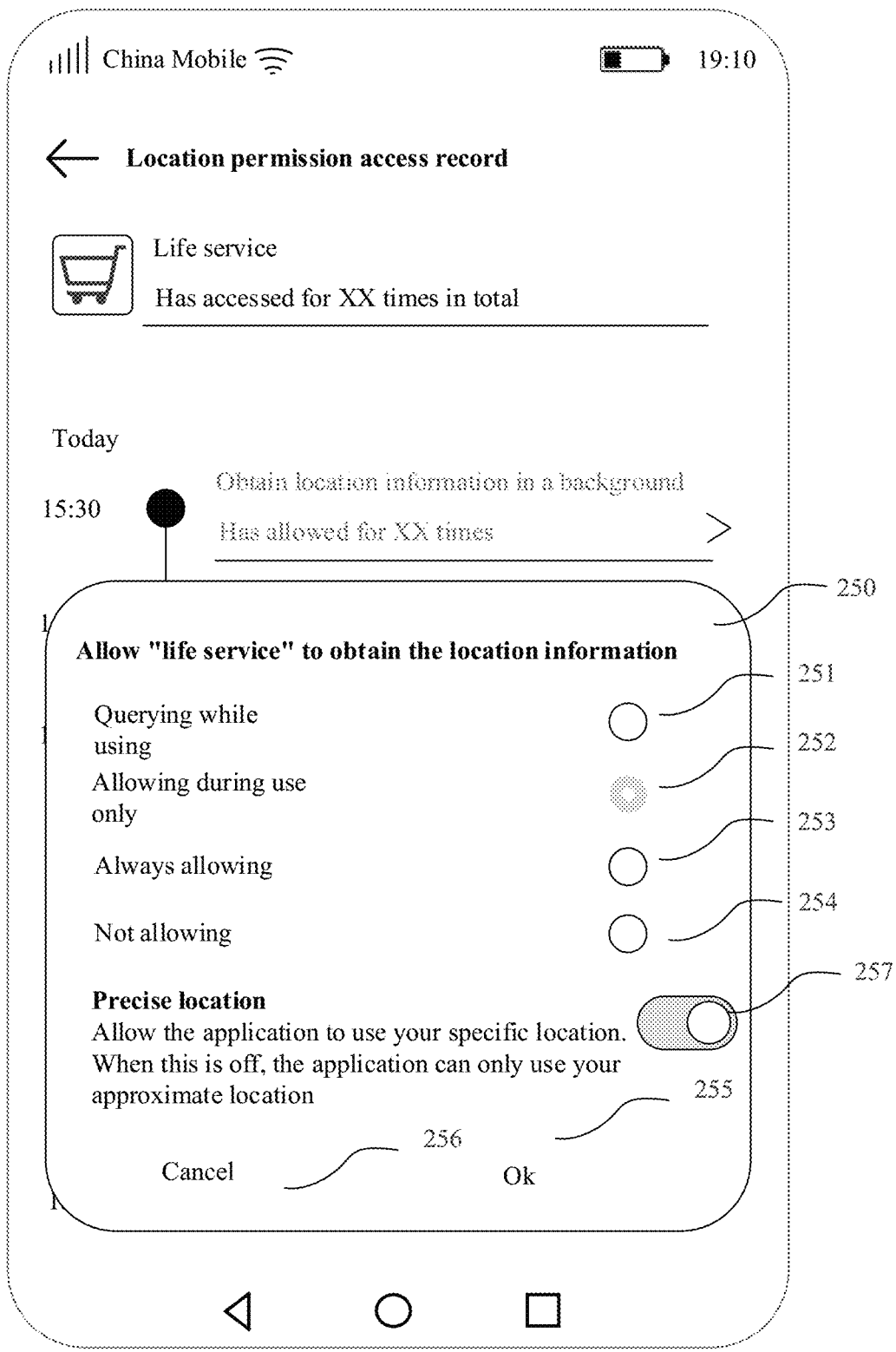

Still referring to FIG. 2D, the electronic device 100 may detect an operation (such as a tap operation) performed by the user on the location permission access record 221: and in response to the operation, the electronic device 100 may display a pop-up interface 250 shown in an example in FIG. 2E.

As shown in FIG. 2E, a "querying while using" option 251, an "allowing during use only" option 252, an "always allowing" option 253, a "not allowing" option 254, an "ok" option 255, and a "cancel" option 256 may be displayed on the pop-up interface 250. The user can set the location permission independently according to a requirement.

It can be learned from FIG. 2E that an authorization manner of the location permission of a current life service application is set to "allowing during use only". If the user needs to modify the location permission, the user may select a corresponding option for modification. For example, if the user needs to modify an authorization manner of the location permission to "querying while using", the user may select the "querying while using" option 251 and tap the "ok" option 255 to modify an authorization manner of the location permission from "allowing during use only" to "querying while using". Optionally, a "precise location" switch option 257 may further be displayed on the pop-up interface 250. If the option is turned on, the application may use a specific location of the user: or if the option is turned off, the application may use only an approximate location of the user.

It should be noted that a process of permission optimization is described above in detail by only using an example in which the electronic device 100 performs optimization on the location permission of the life service application. It can be easily understood that a process in which the electronic device 100 performs optimization on another permission (such as a camera permission, a recording permission, an address book permission, or a storage permission) of another application (such as a browser application or a music application) is similar, and details are not described herein again.

FIG. 3A-FIG. 3G show an example of a group of user interfaces provided by the electronic device 100 for the user to view all privacy access records.

Figure 3A:
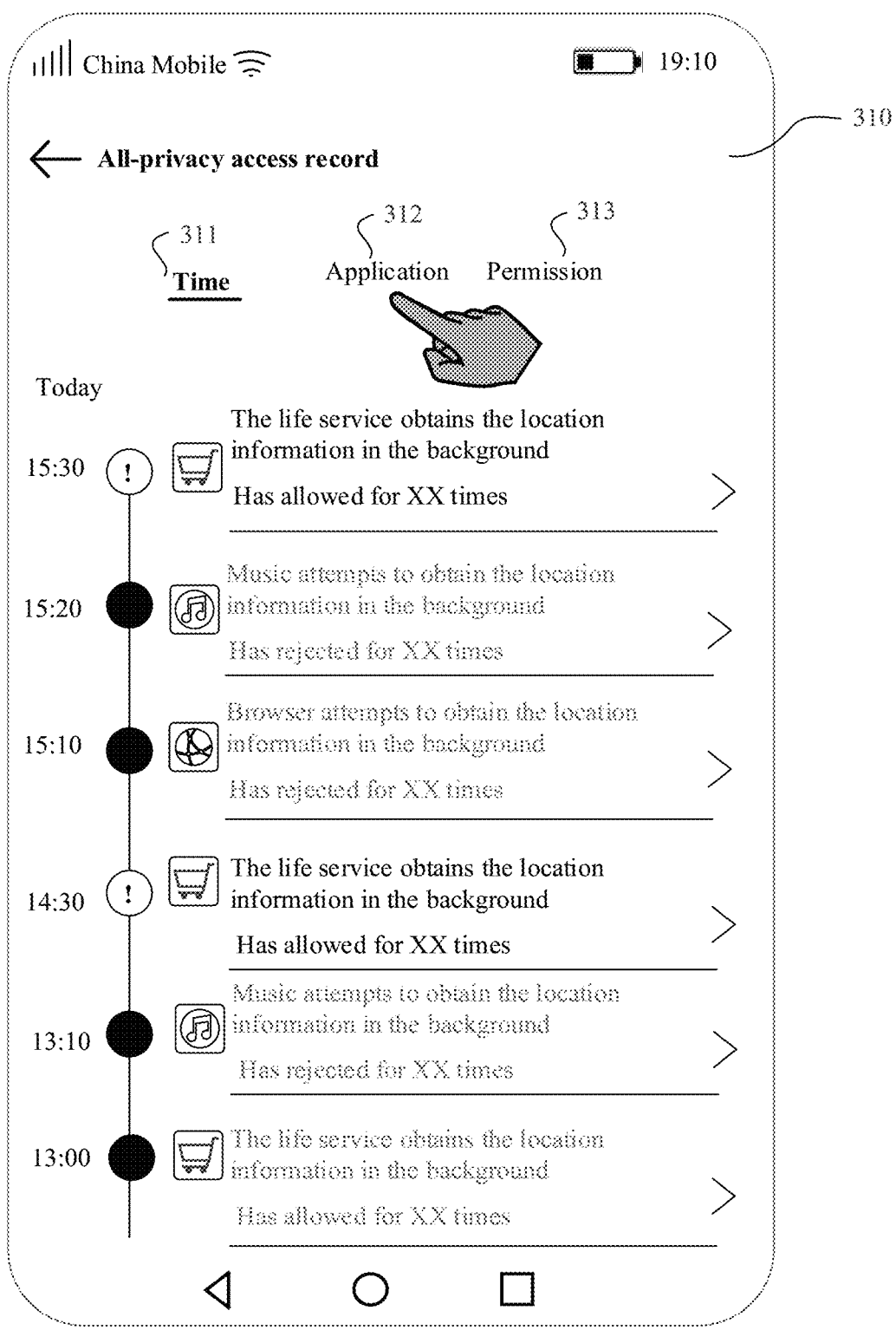
FIG. 3A-FIG. 3G are schematic diagrams of another group of user interfaces according to an embodiment of this application.

Referring to FIG. 2A, the electronic device 100 may detect an operation (such as a tap operation) performed by the user on the all-privacy access record option 215: and in response to the operation, the electronic device 100 may display a user interface 310 shown in an example in FIG. 3A.

FIG. 3A shows an example of a user interface 310 of the all-privacy access record option 215.

As shown in FIG. 3A, the user interface 310 may display a time option 311, an application option 312, a permission option 313, and all privacy access records. The user interface 310 may include three pages (that is, a page corresponding to the time option 311, a page corresponding to the application option 312, and a page corresponding to the permission option 313). These three pages are respectively used to display all privacy access records in a time dimension, an application dimension, and a permission dimension.

Still referring to FIG. 3A, it can be learned that the time option 311 is in a selected state, that is, a current page is a page corresponding to the time option 311. In this case, all privacy access records may be displayed in a time dimension, that is, all the privacy access records may be arranged in chronological order, to distinctively display records in which all applications have used/attempted to use all permissions.

In this way, a requirement that a user needs to view all the privacy access records at a specific time point can be met.

Figure 3B:
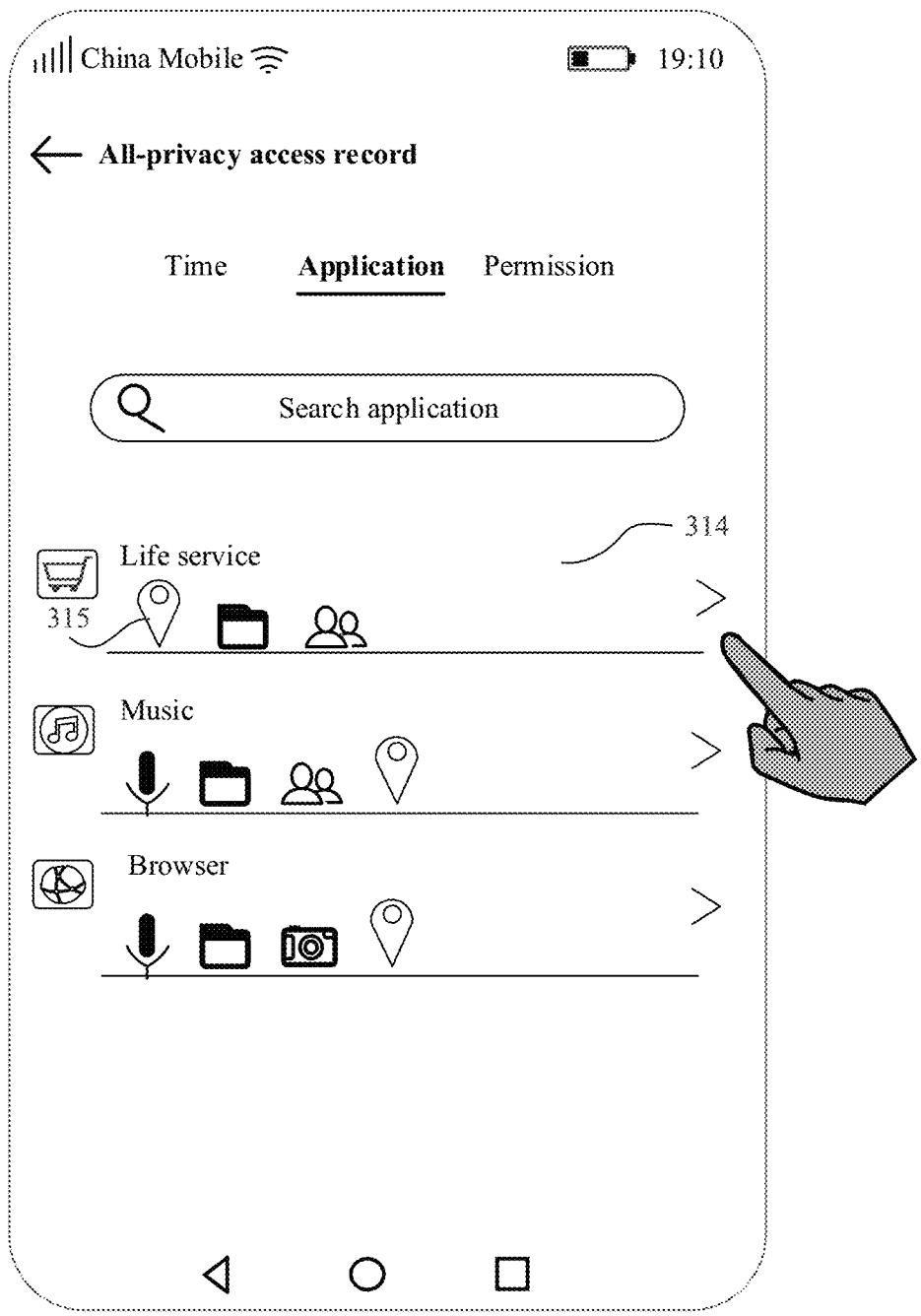

Still referring to FIG. 3A, the electronic device 100 may detect an operation (such as a tap operation) performed by the user on the application option 312: and in response to the operation, the electronic device 100 may place the application option 312 in a selected state shown in an example in FIG. 3B, that is, a current page is a page corresponding to the application option 312. In this case, all privacy access records may be distinctively displayed based on an application name, and each application corresponds to an application permission option. For example, the life service application corresponds to a life service application permission option 314. An icon (such as a location permission icon 315, a storage permission icon, or an address book permission icon) of a permission that the life service application has used/attempted to use may be displayed on the option. The electronic device 100 may detect an operation (such as a tap operation) performed by the user on the life service application option 314: and in response to the operation, the electronic device 100 may display a user interface 320 shown in an example in FIG. 3C. A record in which the life service application has used/attempted to use all permissions may be displayed on the user interface 320).

In this way, a requirement that a user needs to view all privacy access records of a specific application can be met.

Optionally, the user interface 320 may further include a drop-down option 321. The electronic device 100 may detect an operation (such as a tap operation) performed by the user on the drop-down option 321: and in response to the operation, the electronic device 100 may display a window 322 shown in an example in FIG. 3D. The window 322 may include a plurality of permission options, such as an all-permission option, a camera permission option, a recording permission option, an address book permission option, and a storage permission option. The user may select a permission option to view whether the life service application has used/attempted to use the permission. For example, the electronic device 100 may detect an operation (such as a tap operation) performed by the user on the address book permission option: and in response to the operation, the electronic device 100 may display a record in which the life service application has used/attempted to use the address book permission as shown in an example in FIG. 3E.

In this way, the user can view; by using the drop-down option 321, details about a record in which the application has used/attempted to use a specific permission.

Figure 3C:
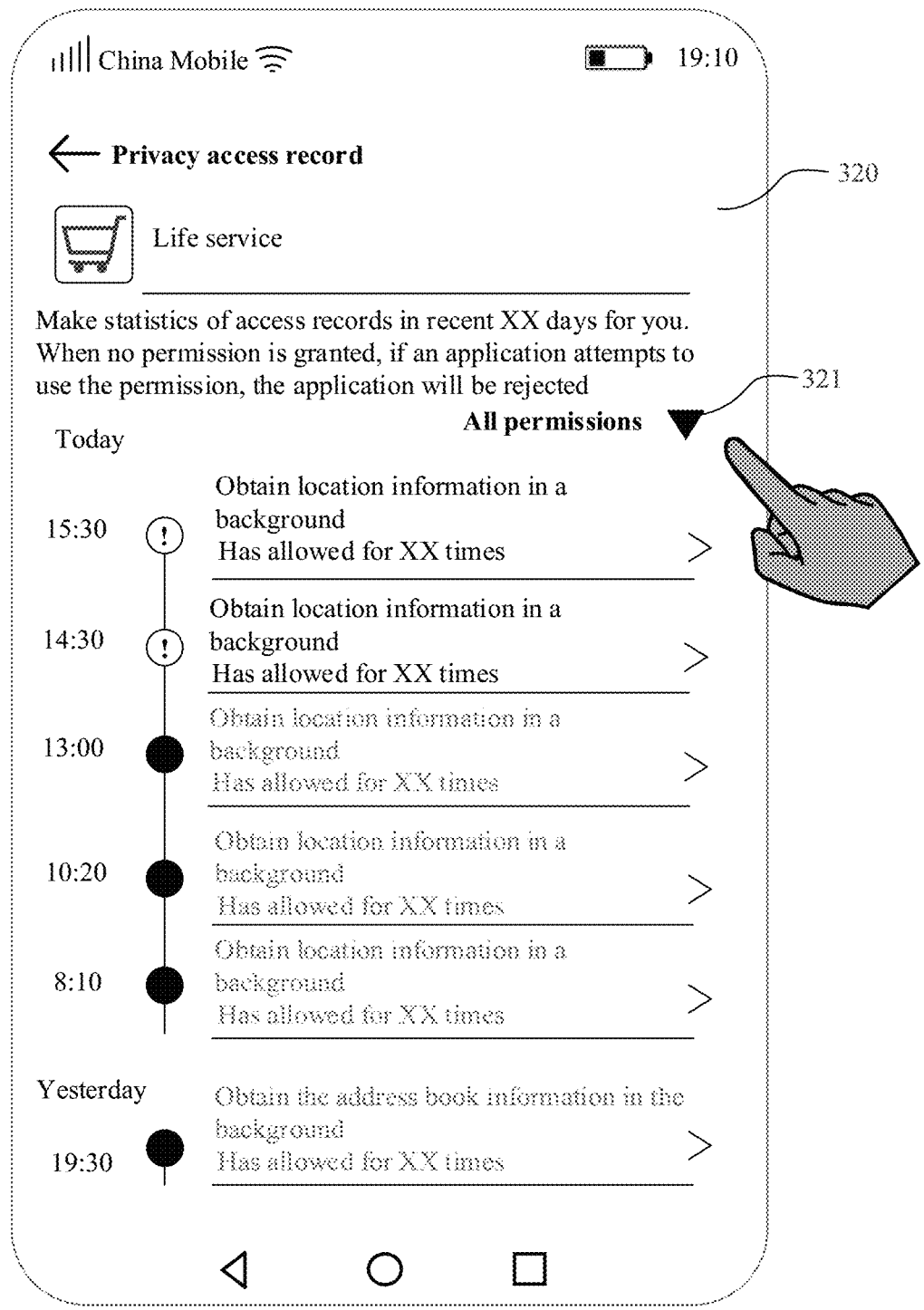
Figure 3D:
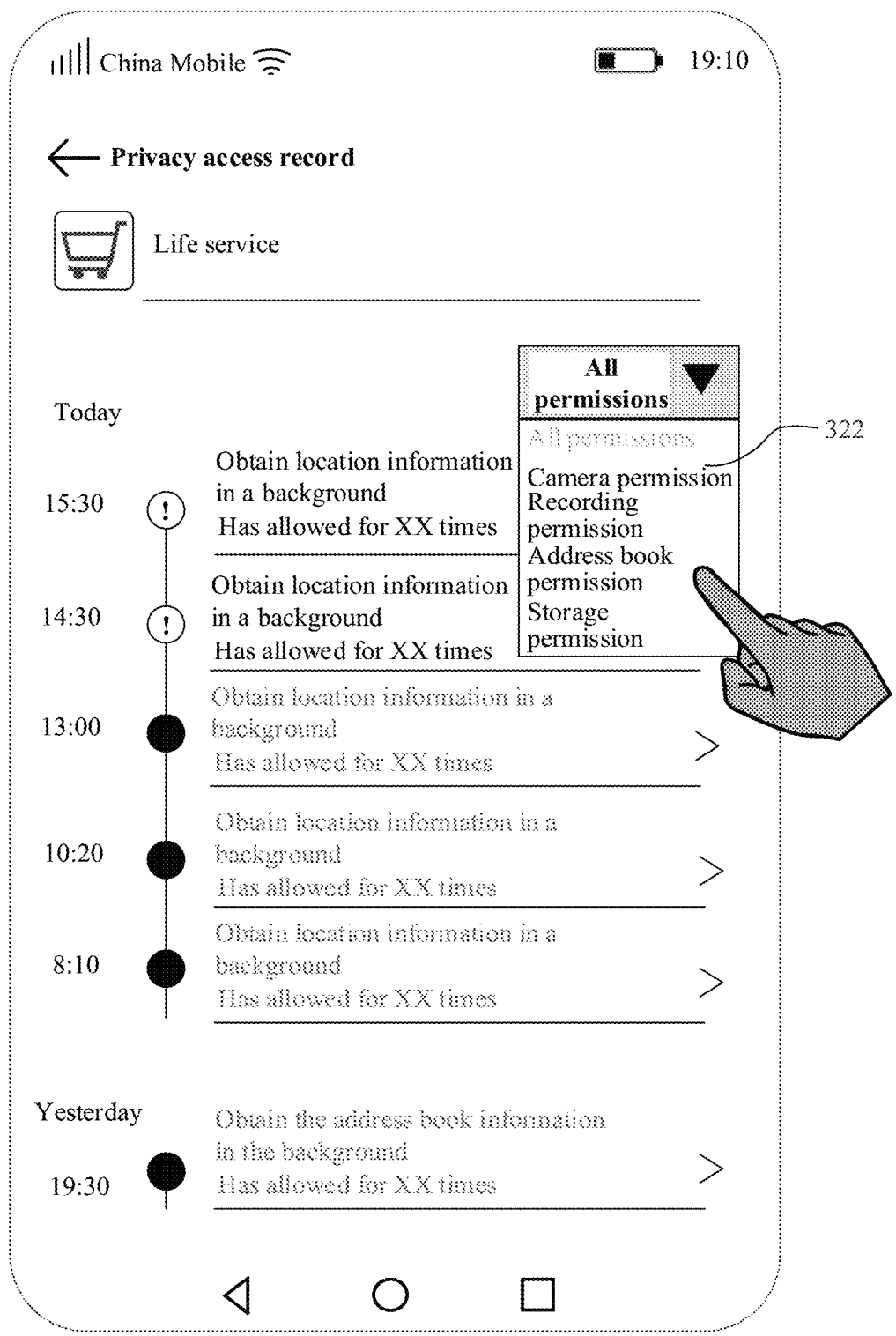
Figure 3E:
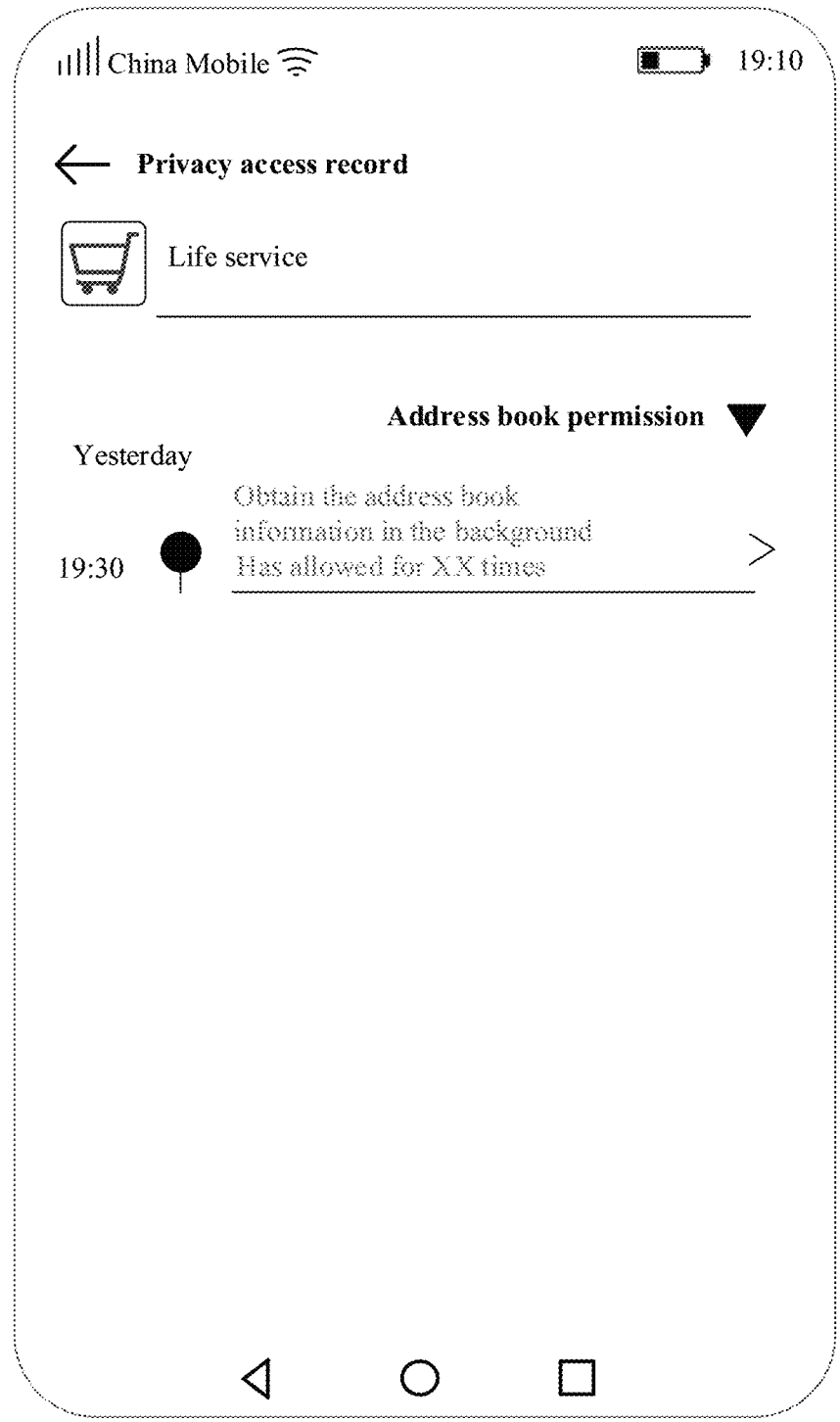
Figure 3F:
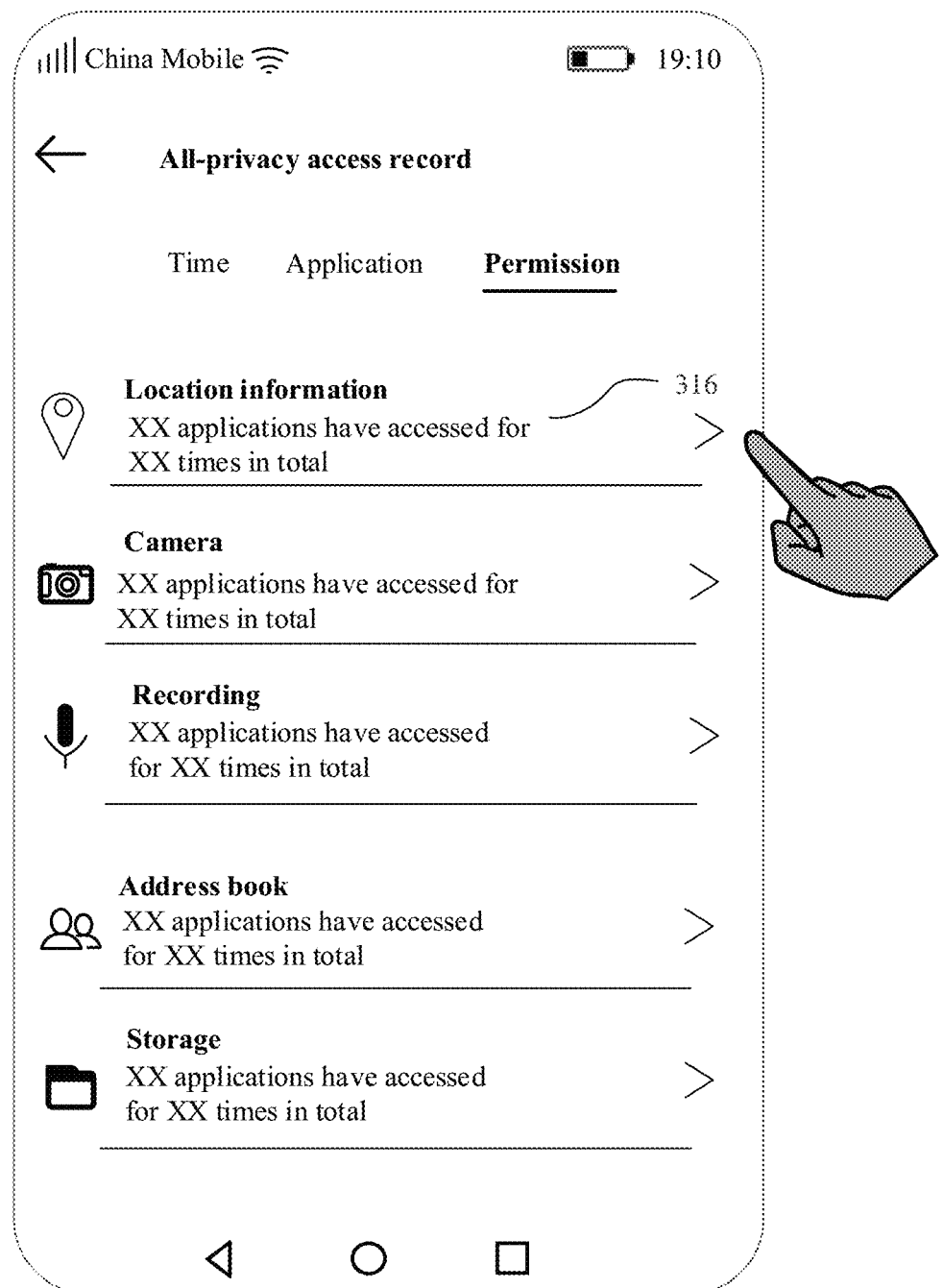
Figure 3G:
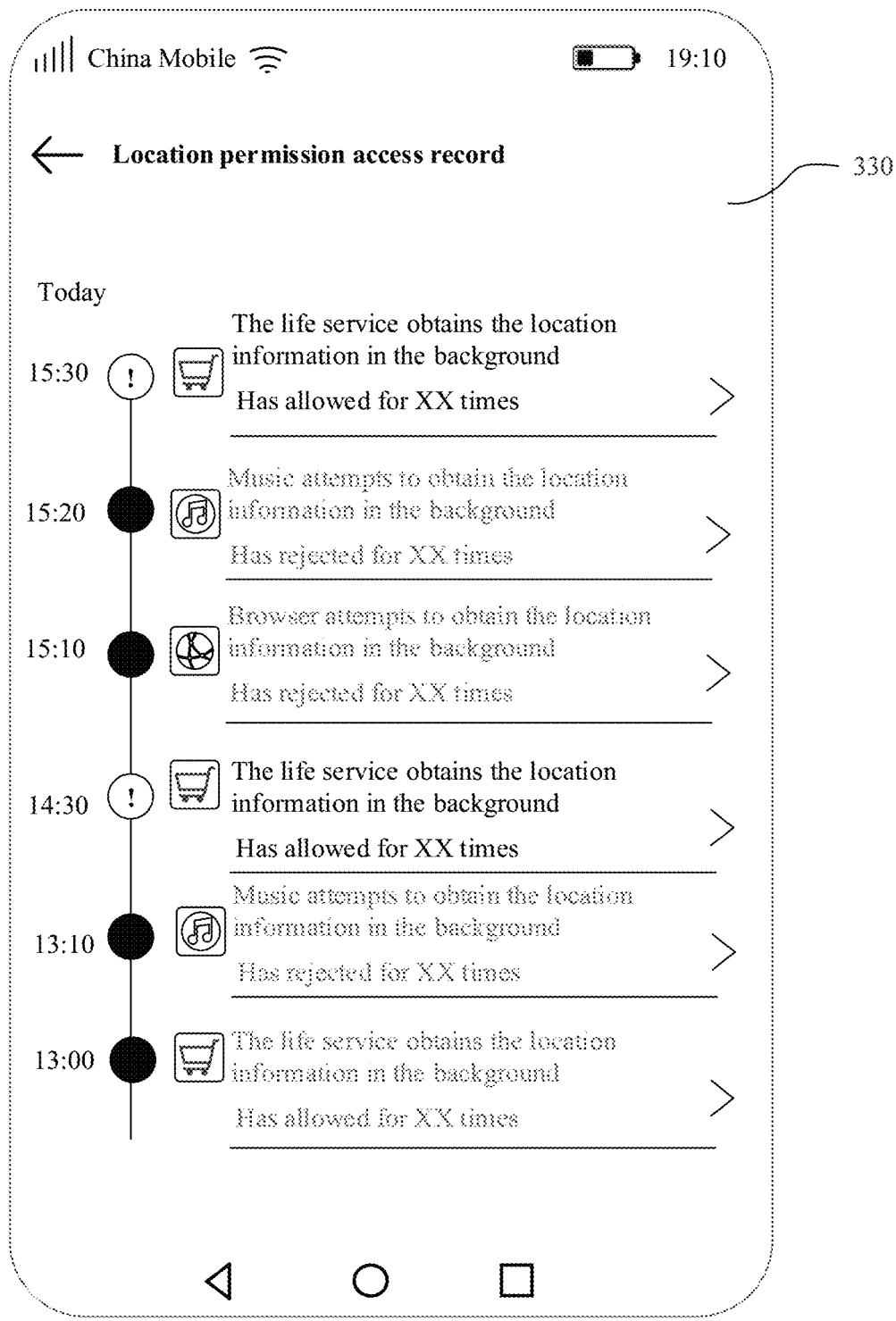

Still referring to FIG. 3A, the electronic device 100 may detect an operation (such as a tap operation) performed by the user on the permission option 313: and in response to the operation, the electronic device 100 may place the permission option 313 in a selected state shown in an example in FIG. 3F, that is, a current page is a page corresponding to the permission option 313. In this case, all privacy access records may be distinctively displayed based on a permission name, and each permission corresponds to a permission record option (for example, the location permission corresponds to a permission record option 316), by the user to view a record in which one or more applications access the permission. For example, if the user needs to view an access record of the location permission, the electronic device 100 may detect an operation (such as a tap operation) performed by the user on the permission record option 316: and in response to the operation, the electronic device 100 may display a user interface 330 shown in an example in FIG. 3G. One or more location permission access records may be displayed on the user interface 330.

In this way, a requirement that a user needs to view all privacy access records of a specific permission can be met.

FIG. 4A-FIG. 4D, FIG. 5A-FIG. 5C, and FIG. 6A-FIG. 6E show another group of user interfaces on which the electronic device 100 guides the user to perform permission optimization.

Figure 4A:
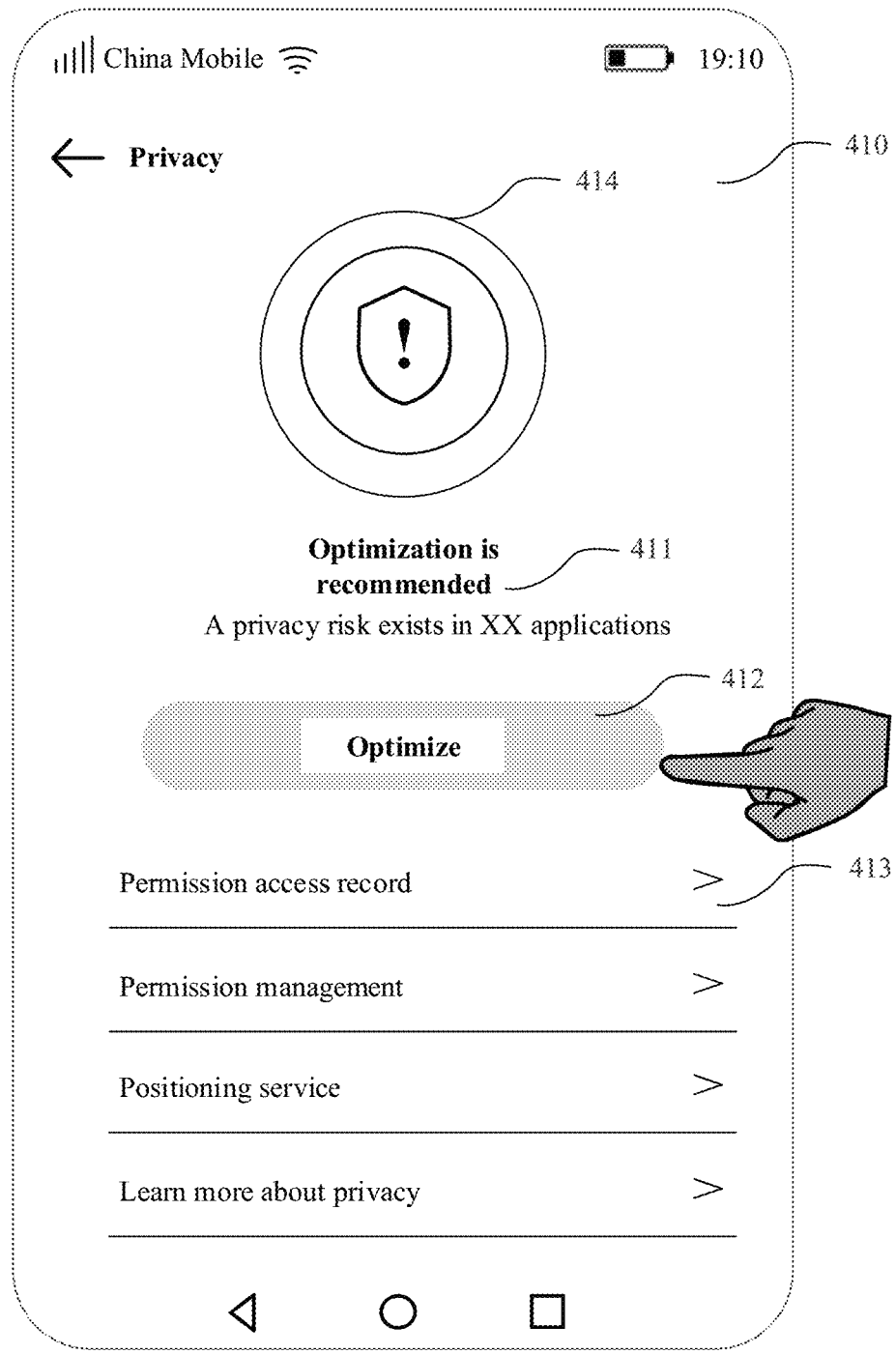
FIG. 4A-FIG. 4D are schematic diagrams of another group of user interfaces according to an embodiment of this application.

Referring to FIG. 1B, the electronic device 100 may detect an operation performed by the user on the privacy setting option 121 (such as a tap operation): and in response to the operation, the electronic device 100 may display a user interface 410 of the privacy setting option 121 shown in an example in FIG. 4A.

As shown in FIG. 4A, prompt information 411, an "optimization" option 412, and a permission access record option 413 may be displayed on the user interface 410. The prompt information 411 is used to remind the user that a privacy risk exists in XX applications, and advise the user to perform permission optimization.

Optionally, an icon 414, a permission management option, a positioning service option, an option of learning more privacy functions, and the like may further be displayed on the user interface 410.

Figure 4B:
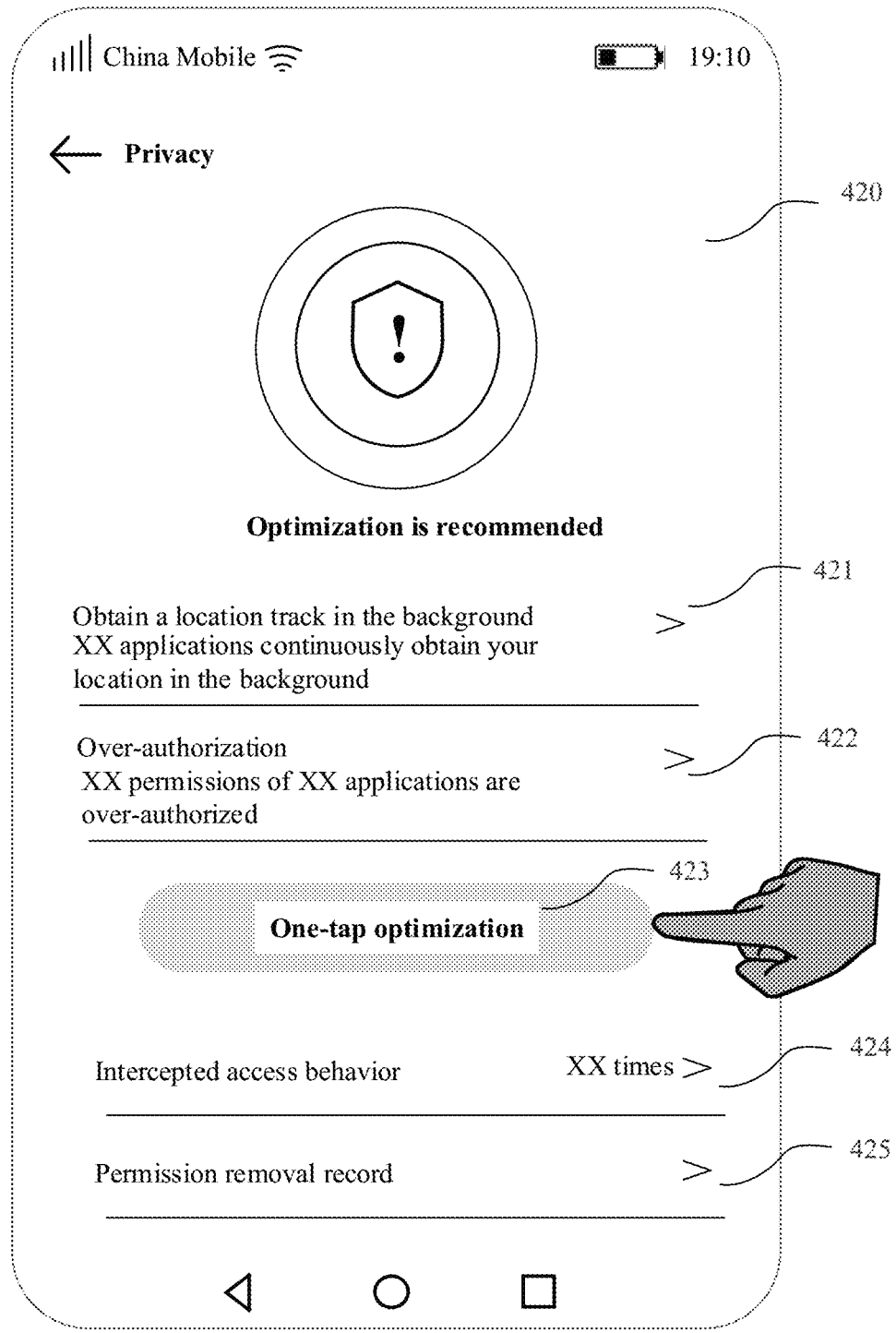

The electronic device 100 may detect an operation (such as a tap operation) performed by the user on the "optimization" option 412: and in response to the operation, the electronic device 100 may display a user interface 420 shown in an example in FIG. 4B.

In a possible implementation, referring to FIG. 2A, the electronic device 100 may alternatively detect an operation (such as a tap operation) performed by the user on the option 211; and in response to the operation, the electronic device 100 may alternatively display the user interface 420 shown in an example in FIG. 4B.

As shown in FIG. 4B, one or more permission information options (such as a location permission information option 421), an over-authorization option 422, a "one-tap optimization" option 423, an intercepted access behavior option 424, a permission removal record option 425, and the like may be displayed on the user interface 420. Prompt information may be displayed on each permission information option. For example, the prompt information displayed by the location permission information option 421 may be information that "XX applications continuously obtain your location in the background". The prompt information is used to remind the user that abnormal use of the permission occurs in an application, and a privacy risk may exist. Prompt information may alternatively be displayed on the over-authorization option 422. For example, the prompt information is that "XX permissions of XX applications are over-authorized". The prompt information is used to remind the user that an application is over-authorized.

It should be noted that only the location permission information option 421 is used as an example of the one or more permission information options: and the one or more permission information options may further include a camera permission information option, a recording permission information option, an address book permission information option, a storage permission information option, and the like. This is not limited herein.

Possible implementations in which the electronic device 100 determines whether an application generates behavior of abnormal use of a permission are as follows:

Possible implementation 1: The electronic device 100 may determine, based on a frequency of using a permission by the application, whether the application generates behavior of abnormal use of the permission.

Specifically: the electronic device 100 may determine whether a quantity of times that a specific application obtains privacy information of the user by using a specific permission within a first preset time period (for example, within three minutes) exceeds a first preset threshold (for example, seven times). If the quantity of times exceeds the first preset threshold, the electronic device 100 determines that the application continuously obtains the privacy information of the user by using the permission, and it may be further determined that the application generates behavior of abnormal use of the permission.

Possible implementation 2: The electronic device 100 may determine, based on an application scenario, whether the application generates behavior of abnormal use of a permission. Specifically, the electronic device 100 may determine whether a specific application uses a permission corresponding to a specific function when the specific function is disabled. If the specific application uses the permission, the electronic device 100 may determine that the application generates behavior of abnormal use of the permission.

For example, a specific application has a specific function of uploading a photo. A permission corresponding to the specific function may be a gallery permission. In a scenario in which the user needs to upload a photo by using the application, the electronic device 100 may use the gallery permission to obtain and upload a photo from the gallery. In this scenario, the electronic device 100 may determine that behavior of the application is normal use of the gallery permission, that is, no behavior of abnormal use of the permission is generated. In a scenario in which the user does not need to upload a photo by using the application, if the electronic device 100 still uses the gallery permission, the electronic device 100 may determine that behavior of the application is abnormal use of the gallery permission, that is, behavior of abnormal use of the permission is generated.

A possible implementation in which the electronic device 100 determines whether an application is over-authorized is as follows:

The electronic device 100 may detect that a specific application is granted a specific permission. Further, the electronic device 100 may compare a permission allowed to be granted to the application in a preset rule with the granted permission. If the granted permission does not match the permission allowed to be granted to the application in the preset rule, the electronic device 100 may determine that the application is over-authorized.

For example, if a permission allowed to be granted to a specific application in a preset rule does not include the location permission, but the electronic device 100 detects that the application is granted the location permission, the electronic device 100 may determine that the application is over-authorized.

The preset rule may be a rule formulated based on a national standard, for example, a core permission specified by the Ministry of Industry and Information Technology, or a personal data minimization principle in the *General Data Protection Regulations* (General Data Protection Regulation, GDPR). Optionally, the preset rule may alternatively be a rule formulated based on a result of a big data statistical analysis.

Still referring to FIG. 4B, for example, the electronic device 100 may guide the user to perform permission optimization in the following three manners:

(1) Permission optimization is performed at a time by using the "one-tap optimization" option 423.

Still referring to FIG. 4B, the electronic device 100 may detect an operation (for example, a tap operation) performed by the user on the "one-tap optimization" option 423: and in response to the operation, the electronic device 100 may perform permission optimization at a time on all applications that use a permission abnormally and all applications that are over-authorized.

Permission optimization performed by the electronic device 100 may specifically include one or more of the following operations performed by the electronic device 100:

The electronic device 100 allows an application to use a permission corresponding to a specific function only when the application enables the specific function: and the electronic device 100 prohibits the application from using a permission that does not match the permission allowed to be granted to the application in the preset rule.

Figure 4C:
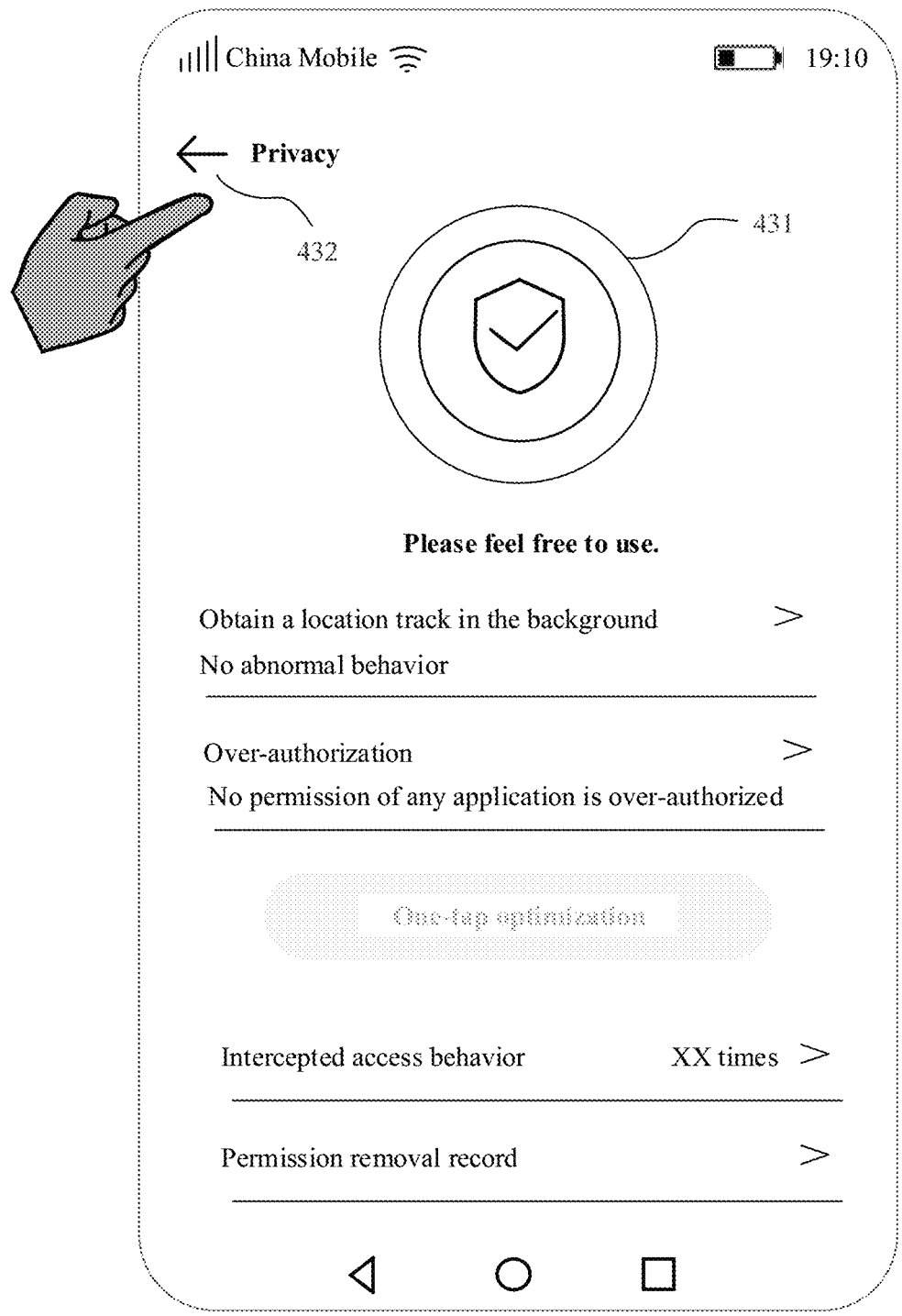

After the permission optimization is completed, as shown in an example in FIG. 4C, the icon 414 on the user interface 410 may be replaced with an icon 431, which is used to remind the user that the permission optimization is completed and can freely use the application program. The prompt information displayed in the location permission information option 421 may alternatively be replaced from information that "XX applications continuously obtain your location in the background" to information that "there is no abnormal behavior". The prompt information is used to remind the user that the application generates no behavior of abnormal use of the permission. The prompt information of the over-authorization option 422 may alternatively be replaced from information that "XX permissions of the XX applications are over-authorized" to information that "no permission of any application is over-authorized". The prompt information is used to remind the user that no application is over-authorized.

In this way, compared with the permission optimization method described in the FIG. 2A-FIG. 2E, a permission optimization method in which permission optimization is performed by using the "one-tap optimization" option 423 at a time can simplify an operation of the user and improve user experience.

Figure 4D:
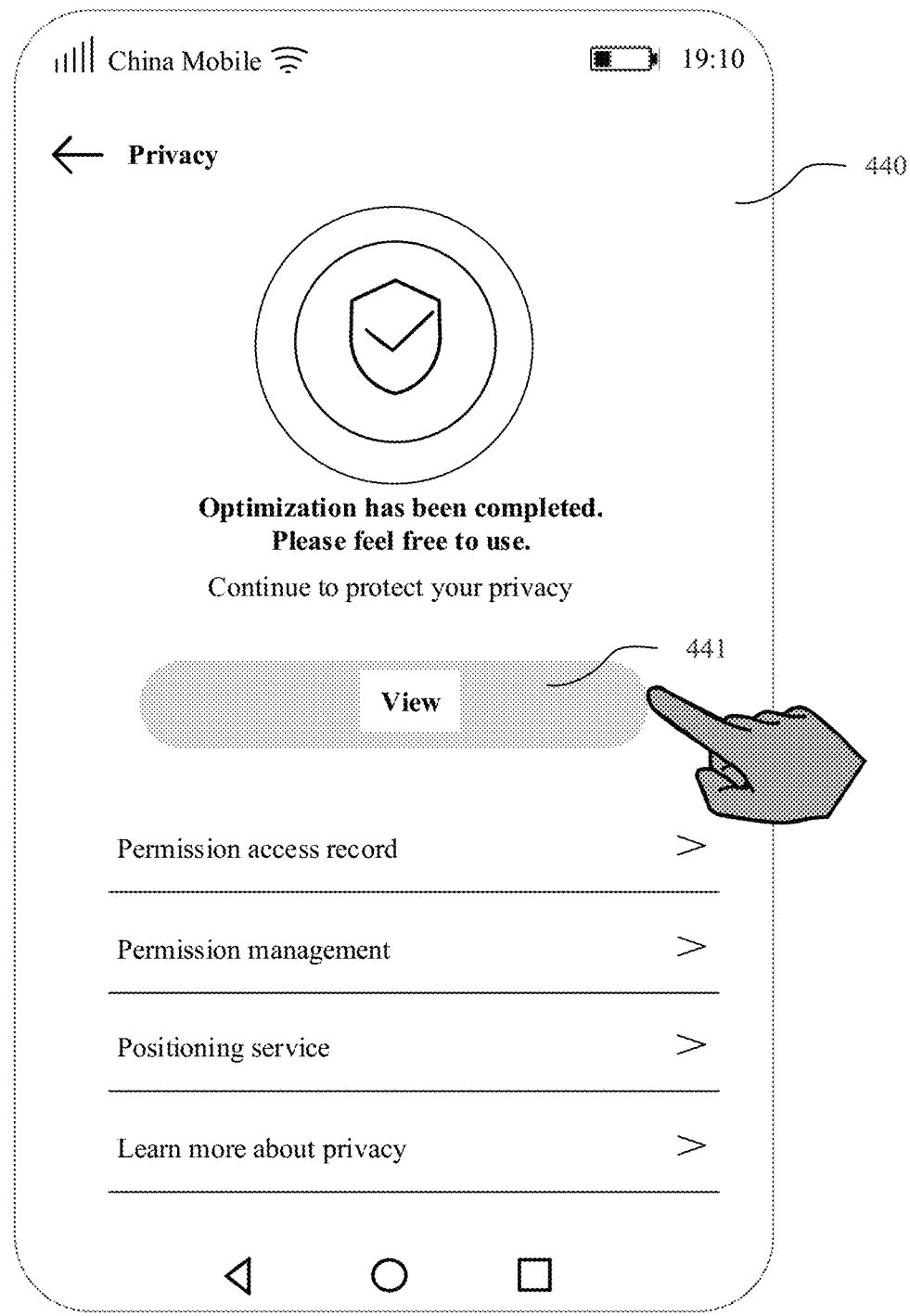

Still referring to FIG. 4C, the electronic device 100 may detect an operation (such as a tap operation) performed by the user on a "return" option 432: and in response to the operation, the electronic device 100 may display a user interface 440 shown in an example in FIG. 4D.

As shown in FIG. 4D, the electronic device 100 may detect an operation (such as a tap operation) performed by the user on a "view" option 441: and in response to the operation, the electronic device 100 may return to display the user interface shown in FIG. 4C.

Permission optimization is not limited to be performed at a time by using the "one-tap optimization" option 423. The electronic device 100 may alternatively guide the user to separately perform permission optimization by using one or more permission information options (for example, the location permission information option 421) and the over-authorization option 422.

The following provides a detailed description with reference to FIG. 5A-FIG. 5C and FIG. 6A-FIG. 6E.

(2) Permission optimization is separately performed by using one or more permission information options (such as the location permission information option 421).

Figure 5A:
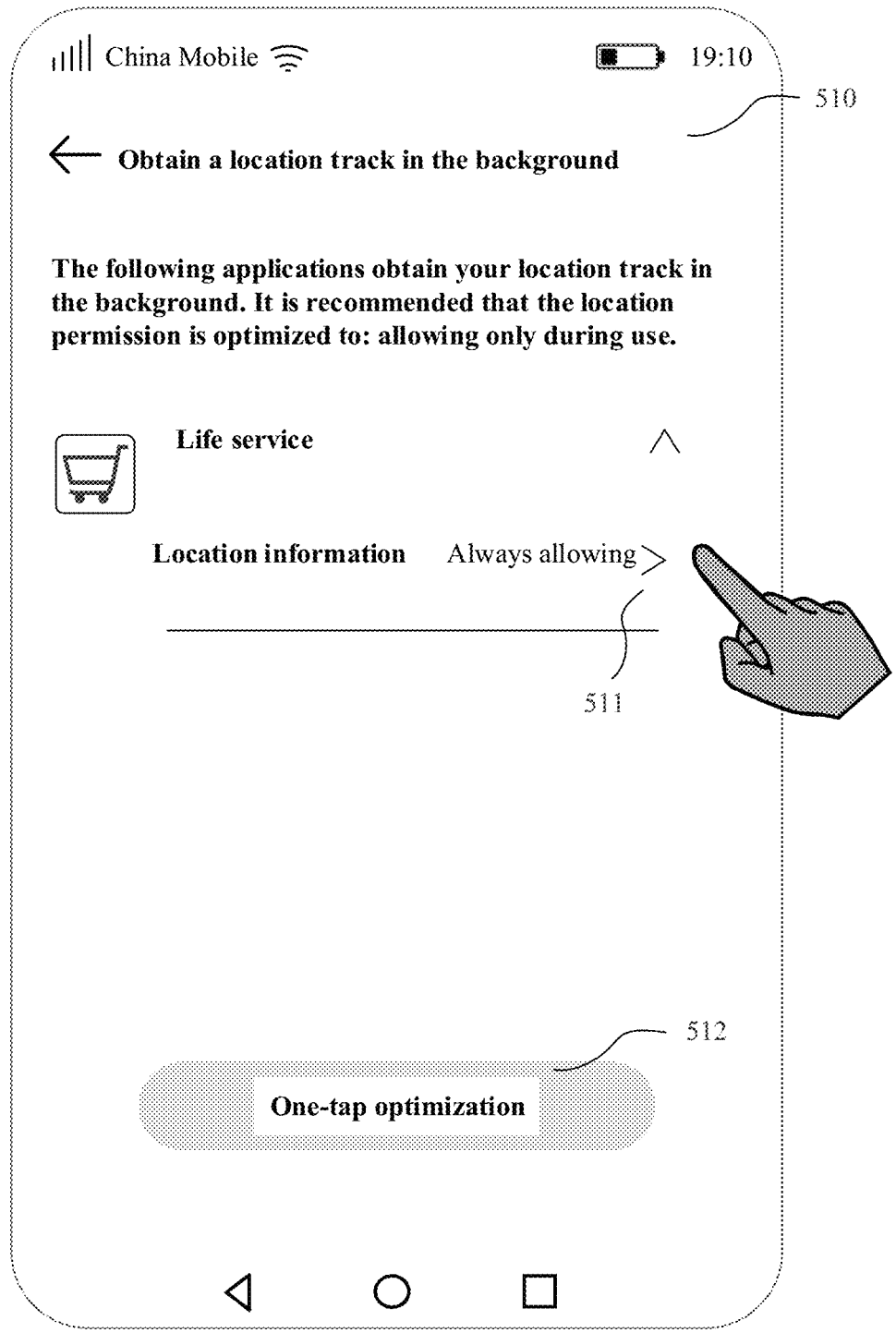
FIG. 5A-FIG. 5C are schematic diagrams of another group of user interfaces according to an embodiment of this application.

Still referring to FIG. 4B, using optimization of the location permission as an example, the electronic device 100 may detect an operation (such as a tap operation) performed by the user on the location permission information option 421: and in response to the operation, the electronic device 100 may display a user interface 510 shown in an example in FIG. 5A.

Figure 5B:
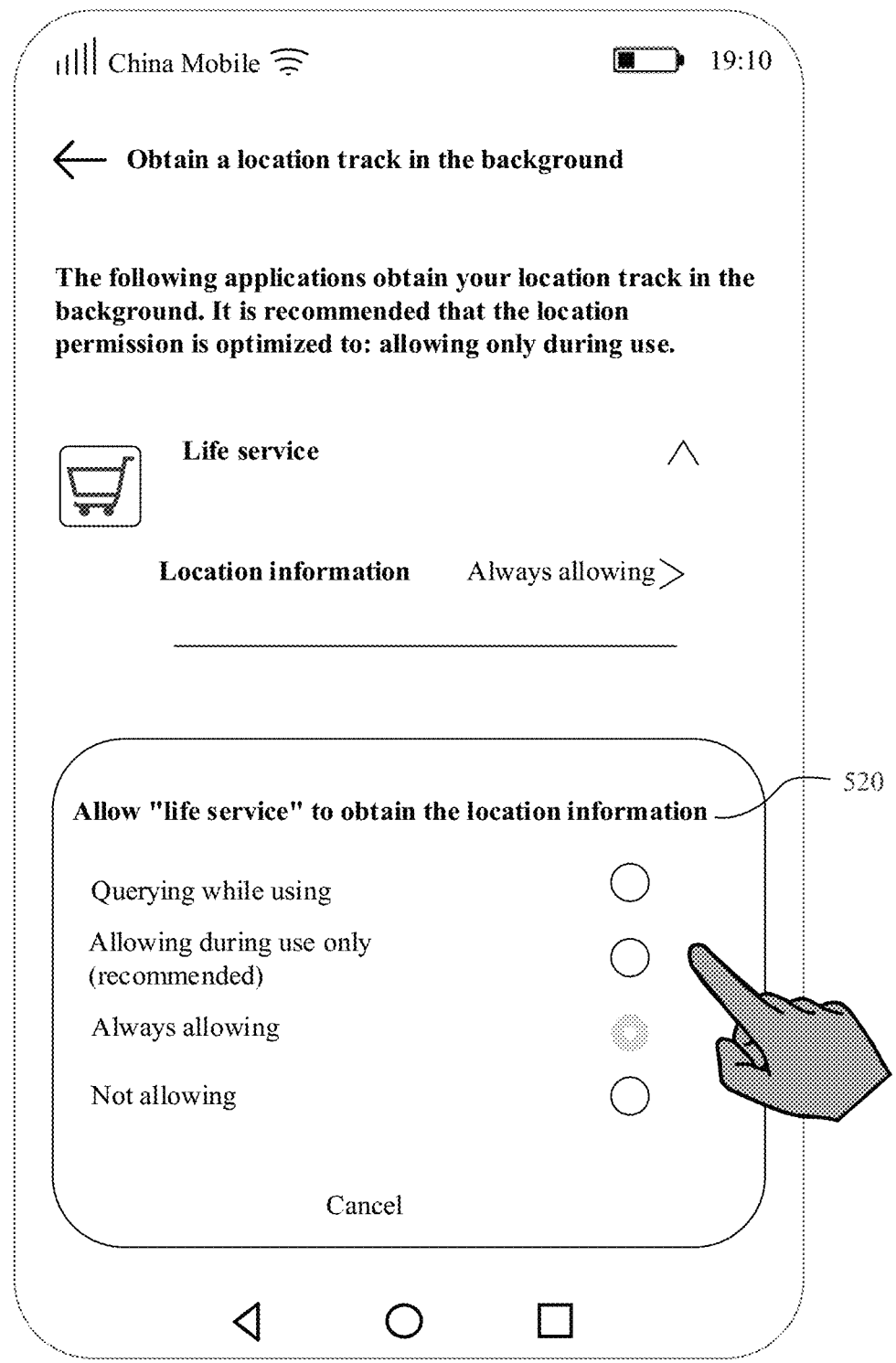
Figure 5C:
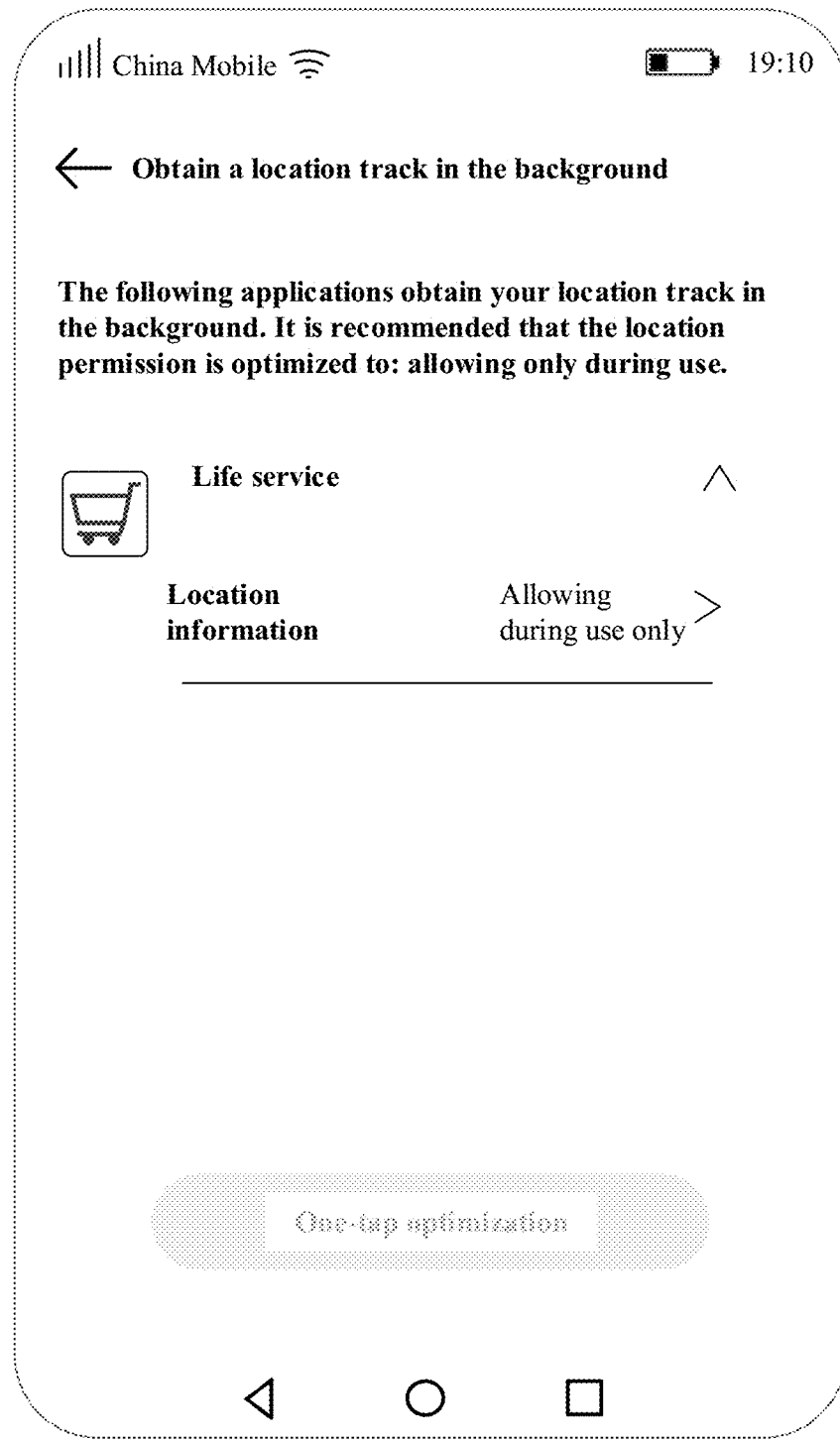

As shown in FIG. 5A, the electronic device 100 may display one or more applications (such as the life service application) that obtain location information of the user in the background, and options (such as an option 511) that are used to set location permissions of the one or more applications. The life service application is used as an example. The electronic device 100 may detect an operation (such as a tap operation) performed by the user on the option 511: and in response to the operation, the electronic device 100 may display a pop-up interface 520 shown in an example in FIG. 5B. As shown in FIG. 5B, an option (such as an "allowing during use only" option) in which the electronic device 100 recommends the user to optimize location permission may be displayed on the pop-up interface 520. The electronic device 100 may detect an operation (such as a tap operation) performed by the user on the "allowing during use only" option: and in response to the operation, as shown in FIG. 5C, the electronic device 100 may set an authorization manner of the location permission of the life service application from "always allowing" to "allowing during use only", thereby completing optimization on the location permission of the life service application.

In a possible implementation, the user may alternatively perform, through one-tap optimization, optimization on location permissions of all applications in which a risk exists. As shown in FIG. 5A, the electronic device 100 may detect an operation (such as a tap operation) performed by a user on a "one-tap optimization" option 512: and in response to the operation, the electronic device 100 may set an authorization manner of the location permission to an authorization manner recommended by the electronic device 100 (such as a manner of "allowing during use only") and display a user interface shown in an example in FIG. 5C. The "one-tap optimization" option 512 may be grayed out, thereby completing optimization on location permissions of all applications in which a risk exists.

(3) Permission optimization is separately performed by using the over-authorization option 422.

Figure 6A:
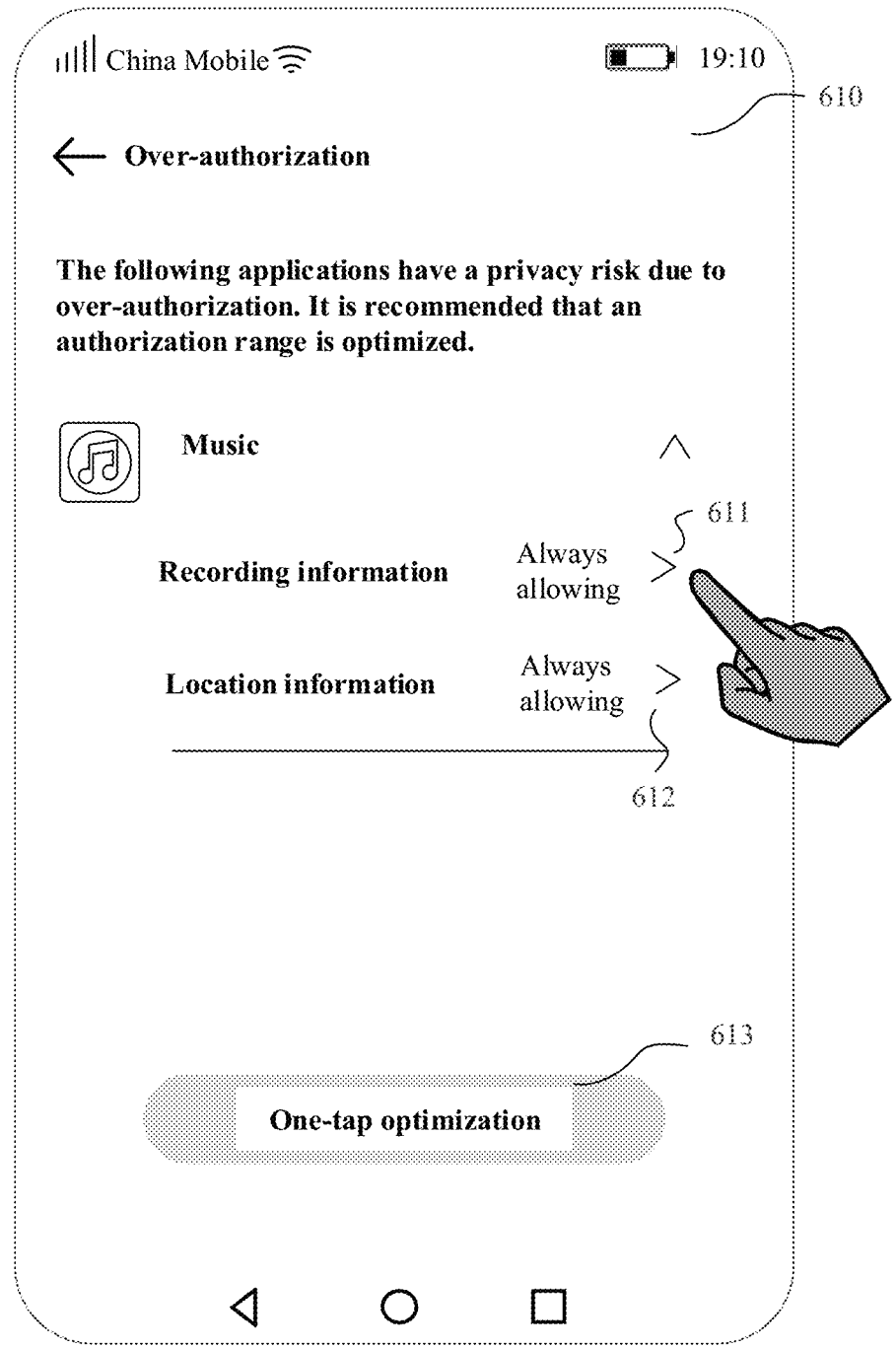
FIG. 6A-FIG. 6E are schematic diagrams of another group of user interfaces according to an embodiment of this application.

Still referring to FIG. 4B, the electronic device 100 may detect an operation (such as a tap operation) performed by the user on the over-authorization option 422; and in response to the operation, the electronic device 100 may display a user interface 610 shown in an example in FIG. 6A.

As shown in FIG. 6A, the electronic device 100 may display one or more applications (such as a music application) in which a privacy risk exists due to over-authorization, and options (such as an option 611, and an option 612) that set permissions that are over-authorized to the one or more applications. The music application is used as an example. As shown in FIG. 6A, it is assumed that over-authorized permissions of the music application are a recording permission and a location permission.

Figure 6B:
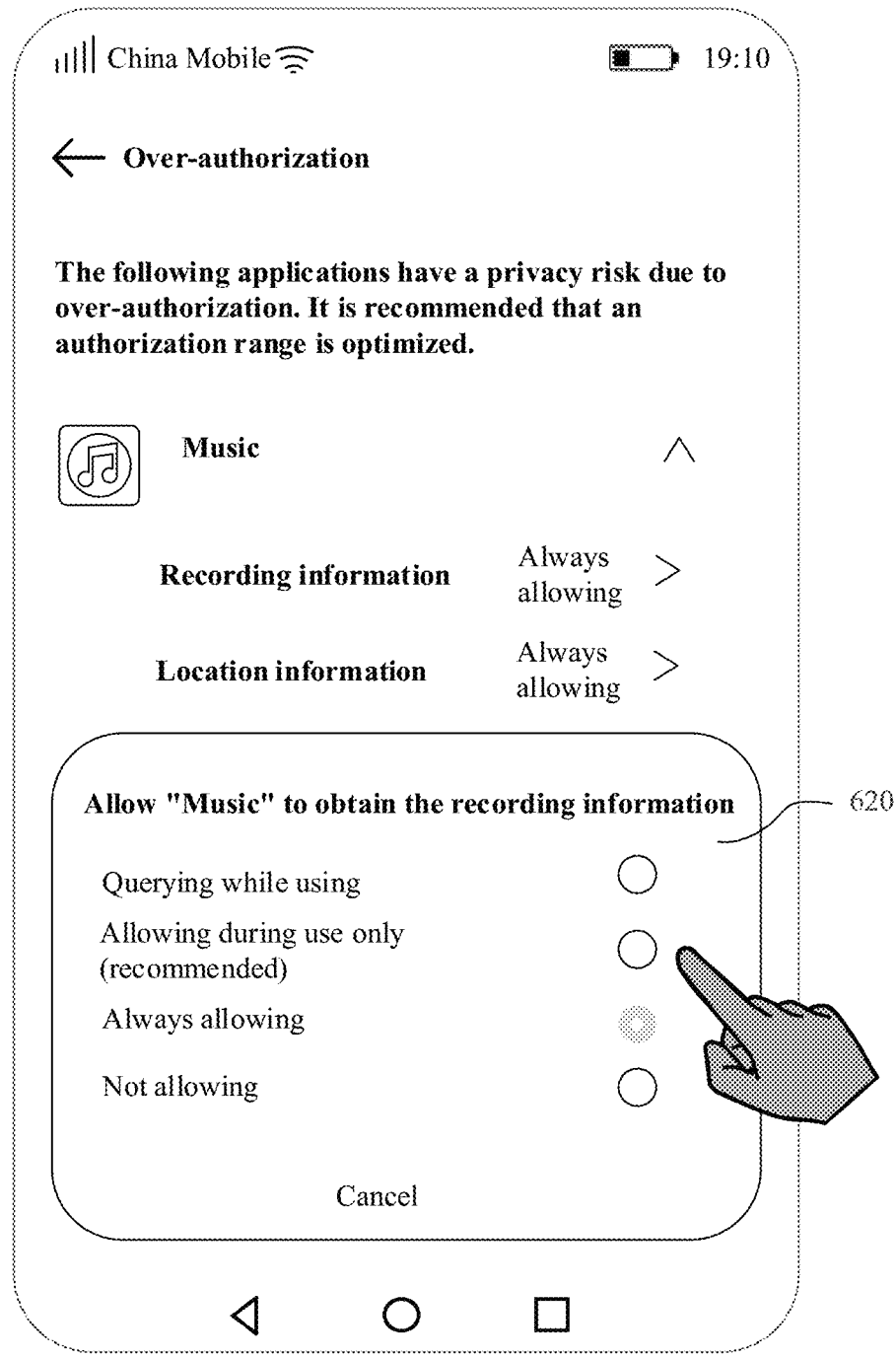

Still referring to FIG. 6A, the electronic device 100 may detect an operation (such as a tap operation) performed by the user on the option 611; and in response to the operation, the electronic device 100 may display a pop-up interface 620 shown in an example in FIG. 6B. As shown in FIG. 6B, an option (such as an "allowing during use only" option) recommended by the electronic device 100 to optimize the location permission of the user may be displayed on the pop-up interface 620. The electronic device 100 may detect an operation (such as a tap operation) performed by the user on the "allowing during use only" option; and in response to the operation, as shown in FIG. 6C, the electronic device 100 may set an authorization manner of the recording permission of the music application from "always allowing" to "allowing during use only", thereby completing optimization on the recording permission of the music application.

Figure 6C:
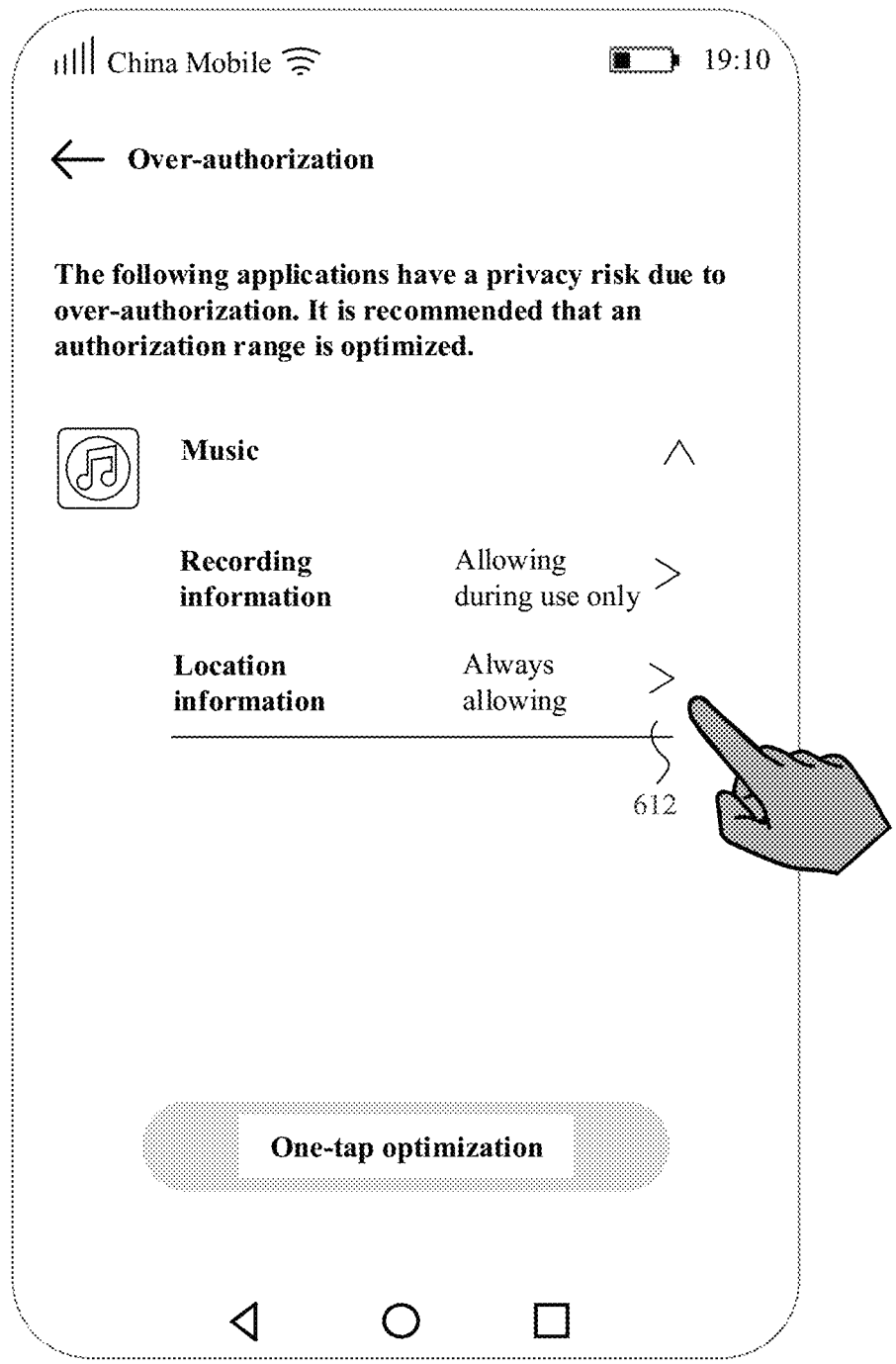
Figure 6D:
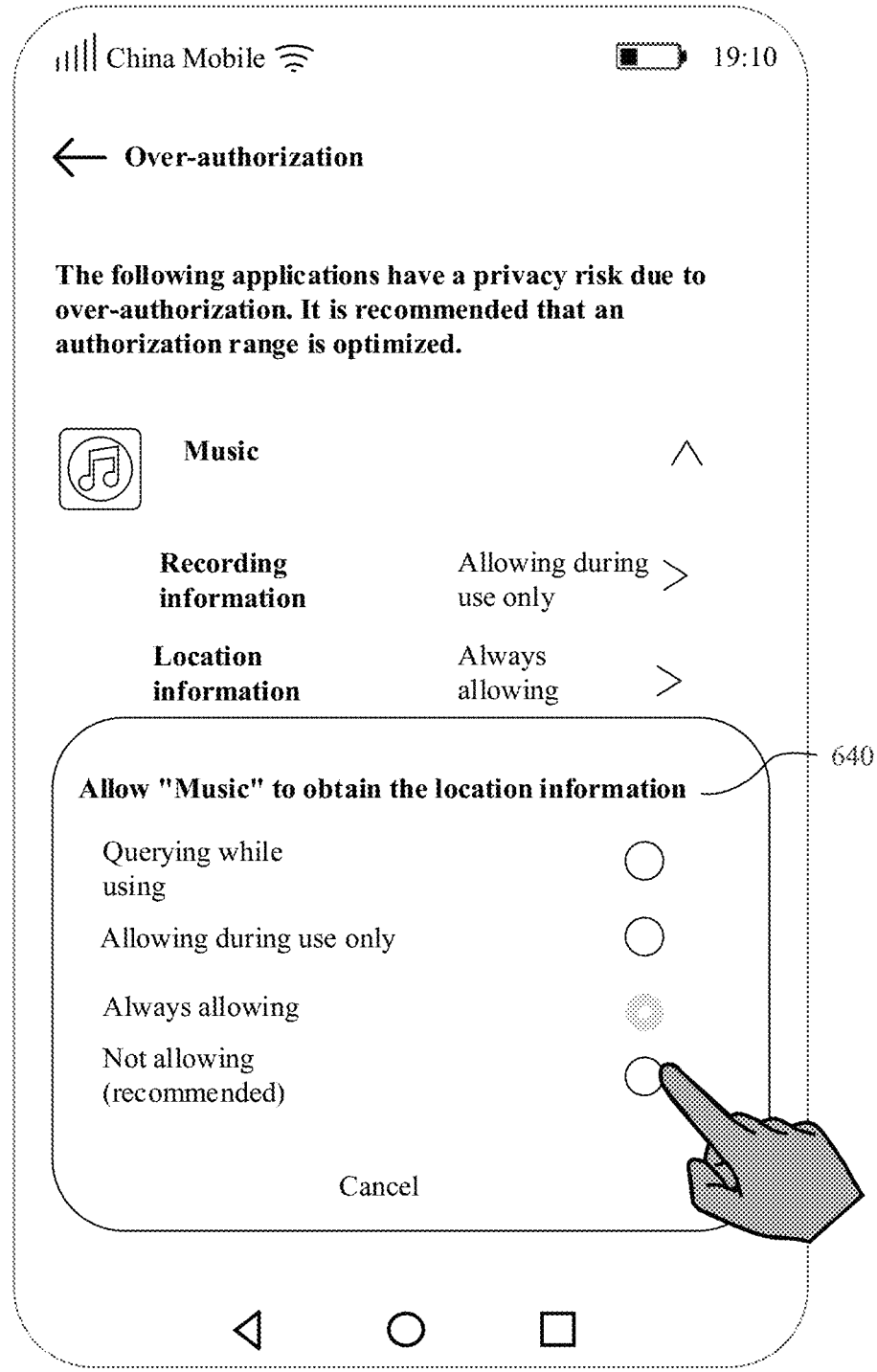
Figure 6E:
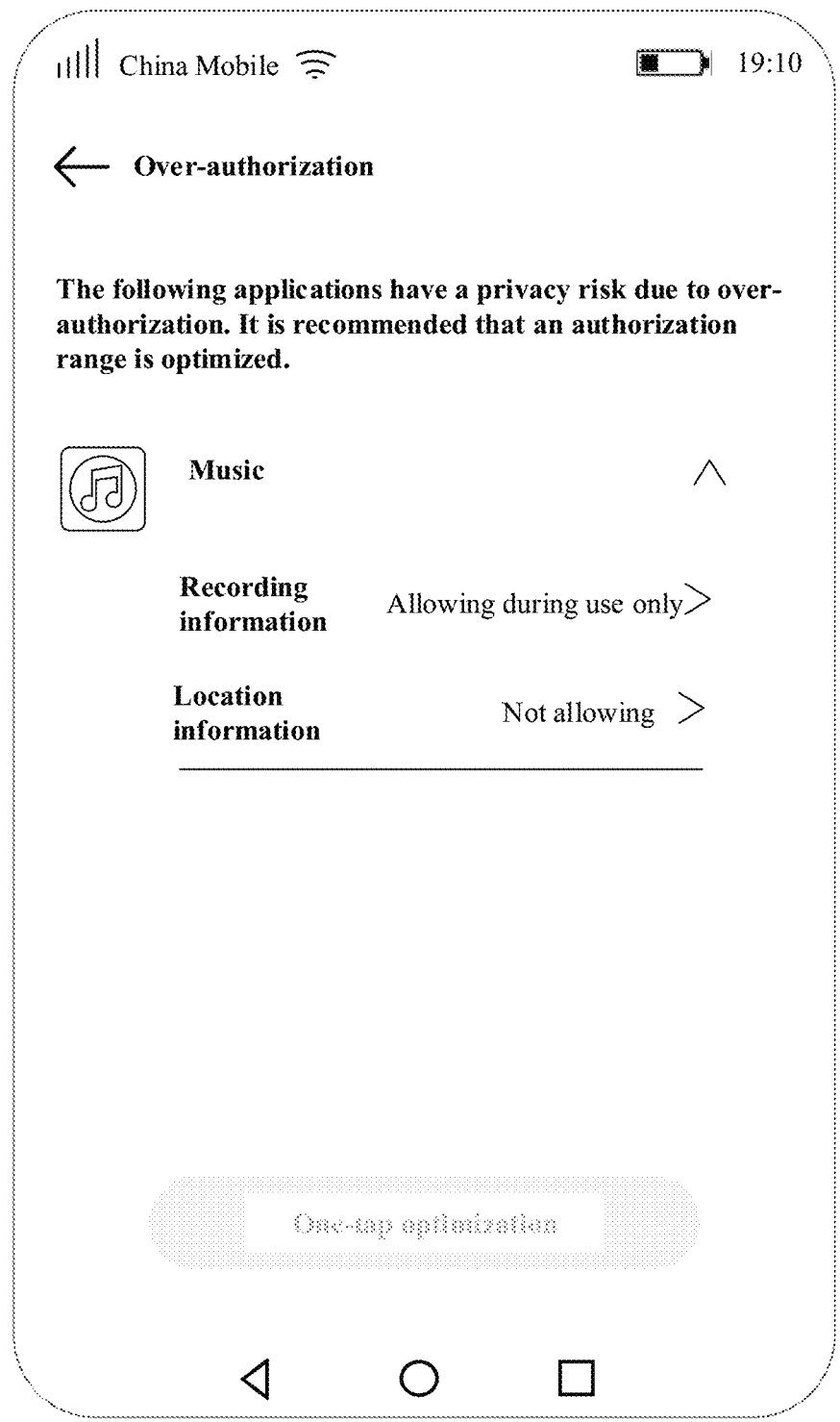

Still referring to FIG. 6C, the electronic device 100 may detect an operation (such as a tap operation) performed by the user on the option 612; and in response to the operation, the electronic device 100 may display a pop-up interface 640 shown in an example in FIG. 6D. As shown in FIG. 6D, an option (such as a "not allowing" option) recommended by the electronic device 100 to optimize the location permission of the user may be displayed on the pop-up interface 640. The electronic device 100 may detect an operation (such as a tap operation) performed by the user on the "not allowing" option: and in response to the operation, as shown in FIG. 6E, the electronic device 100 may set an authorization manner of the recording permission of the music application from "always allowing" to "not allowing", thereby completing optimization on the recording permission of the music application.

In a possible implementation, the user may alternatively perform, through one-tap optimization, optimization on permissions that are over-authorized to all applications in which a risk exists. As shown in FIG. 6A, the electronic device 100 may detect an operation (such as a tap operation) performed by a user on a "one-tap optimization" option 613; and in response to the operation, the electronic device 100 may set authorization manners of permissions of all applications that are over-authorized and in which a risk exists to an authorization manner recommended by the electronic device 100, and display a user interface shown in an example in FIG. 6E. The "one-tap optimization" option 613 may be grayed out, thereby completing optimization on the permissions that are over-authorized to all applications in which a risk exists.

FIG. 7A-FIG. 7D show a group of user interfaces provided by the electronic device 100 for the user to view permission access records, intercepted access behavior, and permission removal records.

Figure 7A:
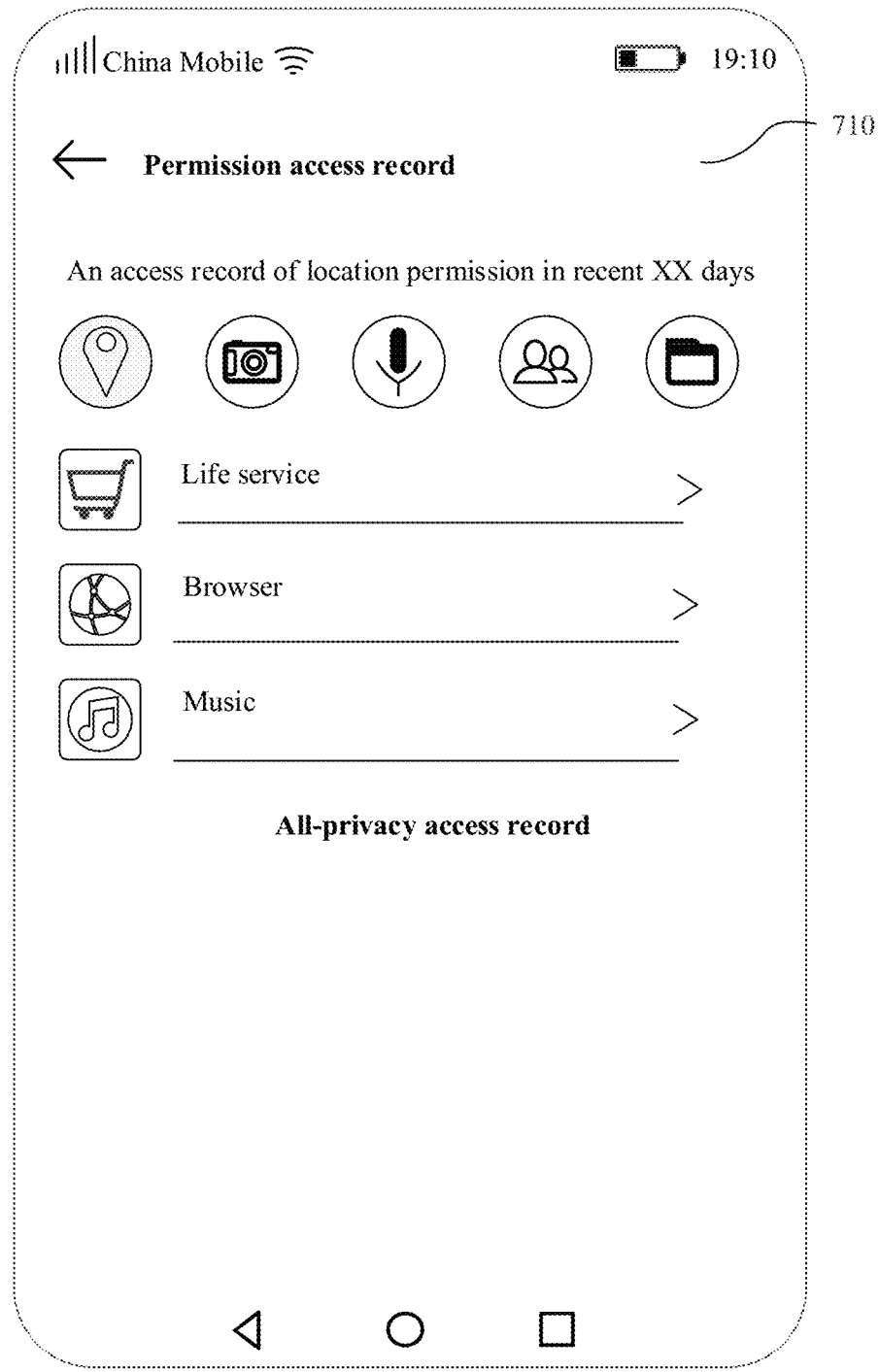
FIG. 7A-FIG. 7E are schematic diagrams of another group of user interfaces according to an embodiment of this application.

Referring to FIG. 4A, the electronic device 100 may detect an operation (such as a tap operation) performed by the user on the permission access record option 413; and in response to the operation, the electronic device 100 may display a user interface 710 shown in an example in FIG. 7A. For the user interface 710 shown in FIG. 7A, refer to a text description of the user interface shown in FIG. 2A. Details are not described herein again.

As shown in FIG. 7A, the user may view a permission access record by performing an operation on an option displayed on the user interface, and further perform permission optimization. For a specific operation process of viewing a permission access record and performing permission optimization, refer to text descriptions of FIG. 2A-FIG. 2E and FIG. 3A-FIG. 3G. Details are not described herein again.

Figure 7B:
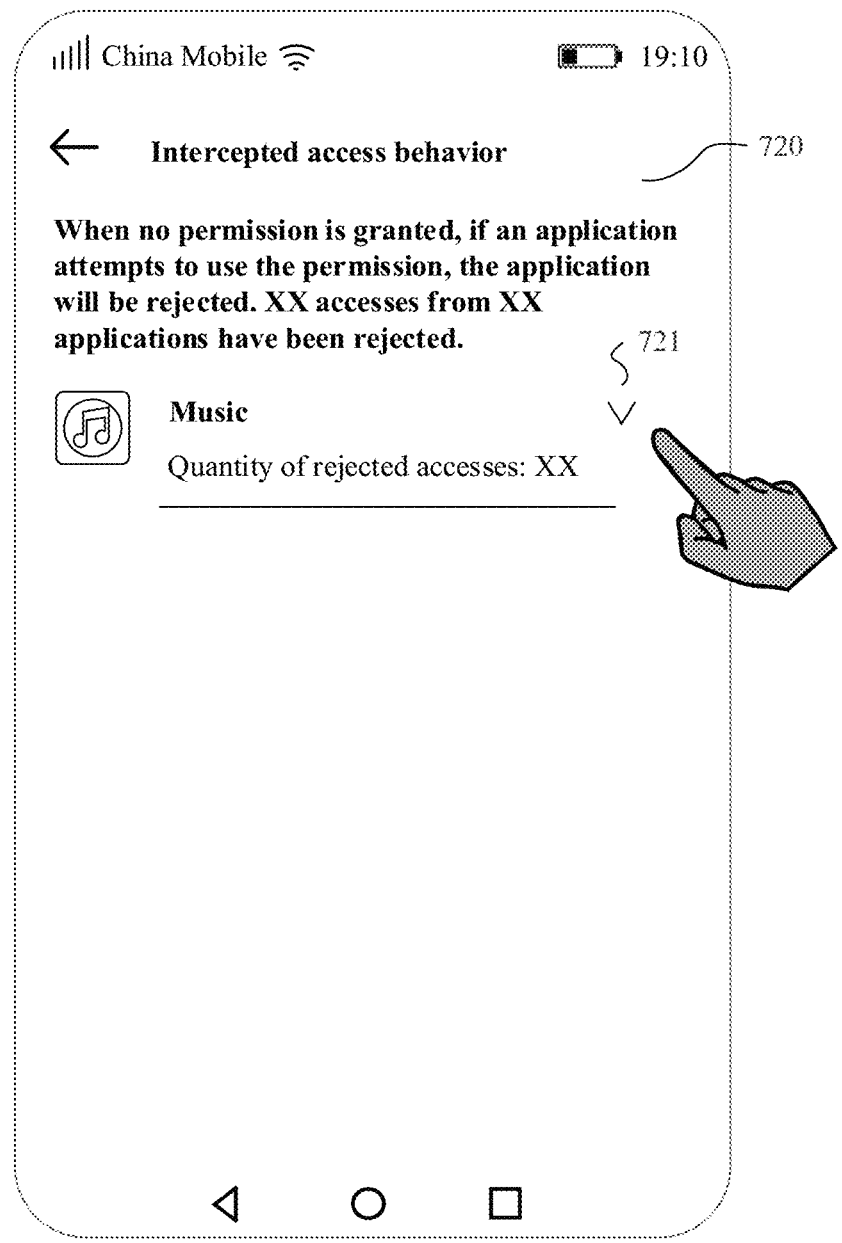
Figure 7C:
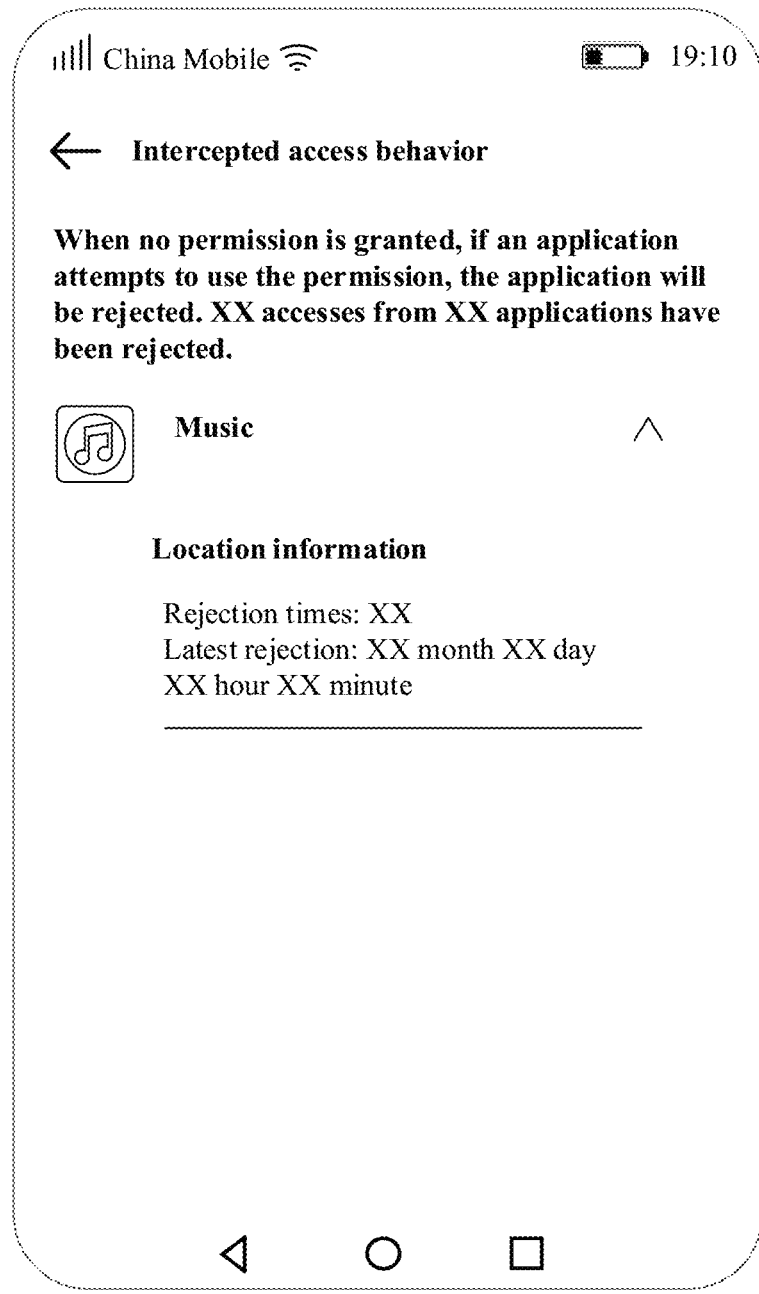

Referring to FIG. 4B, the electronic device 100 may detect an operation (such as a tap operation) performed by the user on the intercepted access behavior option 424; and in response to the operation, the electronic device 100 may display a user interface 720 shown in an example in FIG. 7B.

As shown in FIG. 7B, a total quantity of times that one or more applications attempt to use an unauthorized permission (for example, as shown in FIG. 7B, a quantity of times that the music application is refused to access is XX) in recent XX days (for example, 7 days) may be displayed on the user interface 720. Using the music application as an example, the electronic device 100 may detect an operation (such as a tap operation) performed by the user on an option 721; and in response to the operation, the electronic device 100 may display detailed information such as an unauthorized permission attempted to be used by the music application shown in an example in FIG. 7C in recent XX days (for example, 7 days), a quantity of times that a corresponding permission refuses to be accessed, and a recent rejection time point (for example, a quantity of rejection times of the location permission: XX, and latest rejection: XX month/XX day/XX:XX).

To protect data of the user and ensure privacy security of the user, the electronic device 100 may automatically remove access permissions of applications not used by the user in recent XX months, and may provide a permission removal record for the user to view.

Figure 7D:
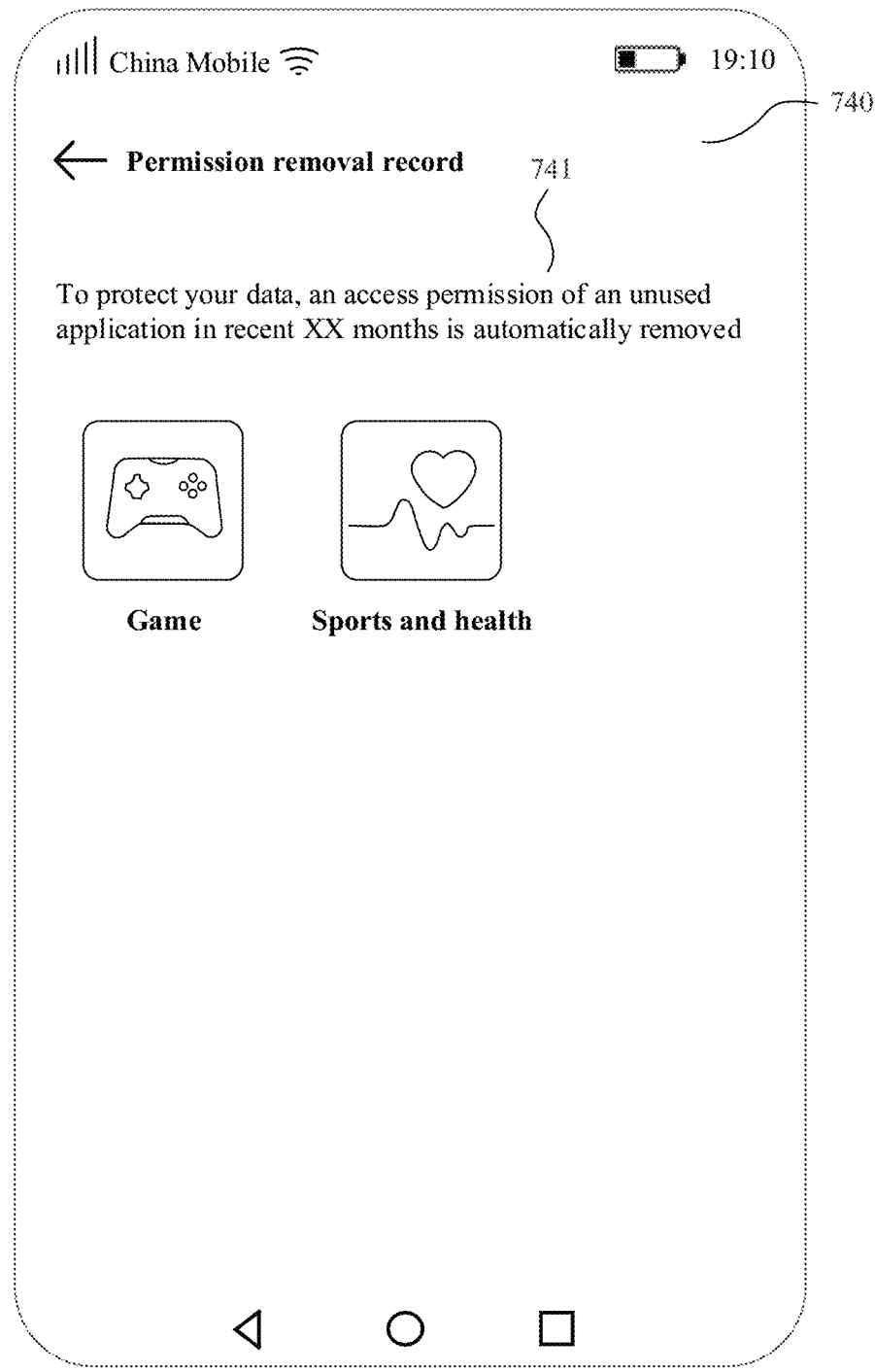

For example, referring to FIG. 4B, the electronic device 100 may detect an operation (such as a tap operation) performed by the user on the permission removal record option 425; and in response to the operation, the electronic device 100 may display a user interface 740 shown in an example in FIG. 7D. The user interface 740 is used by the user to view a record in which access permissions of unused applications in recent XX months are automatically removed. As shown in FIG. 7D, prompt information 741 and one or more applications (such as a game application and a sports and health application) that are not used in recent XX months may be displayed on the user interface 740. Access permissions of these applications are automatically removed by the electronic device 100.

Figure 7E:
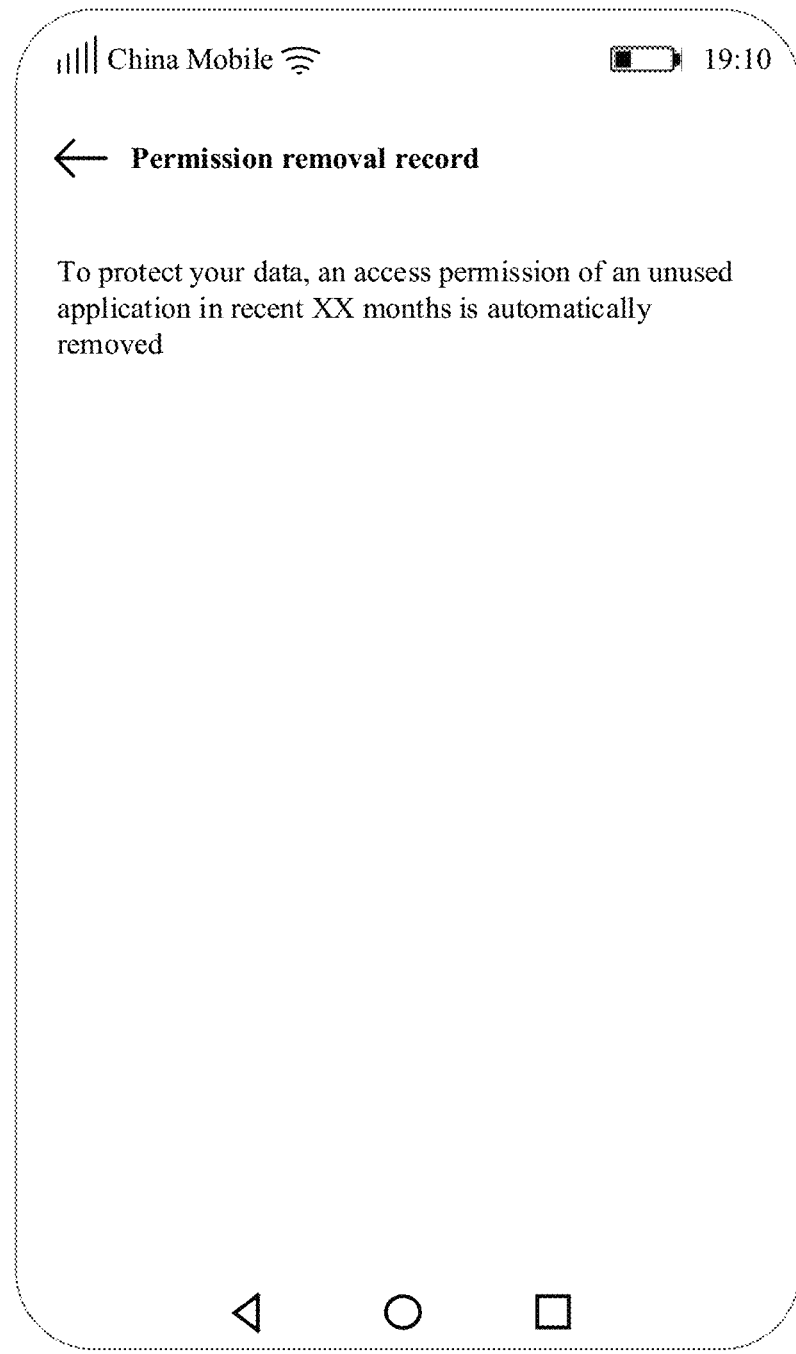

As shown in FIG. 7E, if a quantity of applications not used by the electronic device 100 in recent XX months is zero, a quantity of applications displayed on the user interface 740 is zero, which indicates that a quantity of the applications not used by the electronic device 100 in recent XX months is zero, and the electronic device 100 does not automatically remove access permissions.

Figure 8:
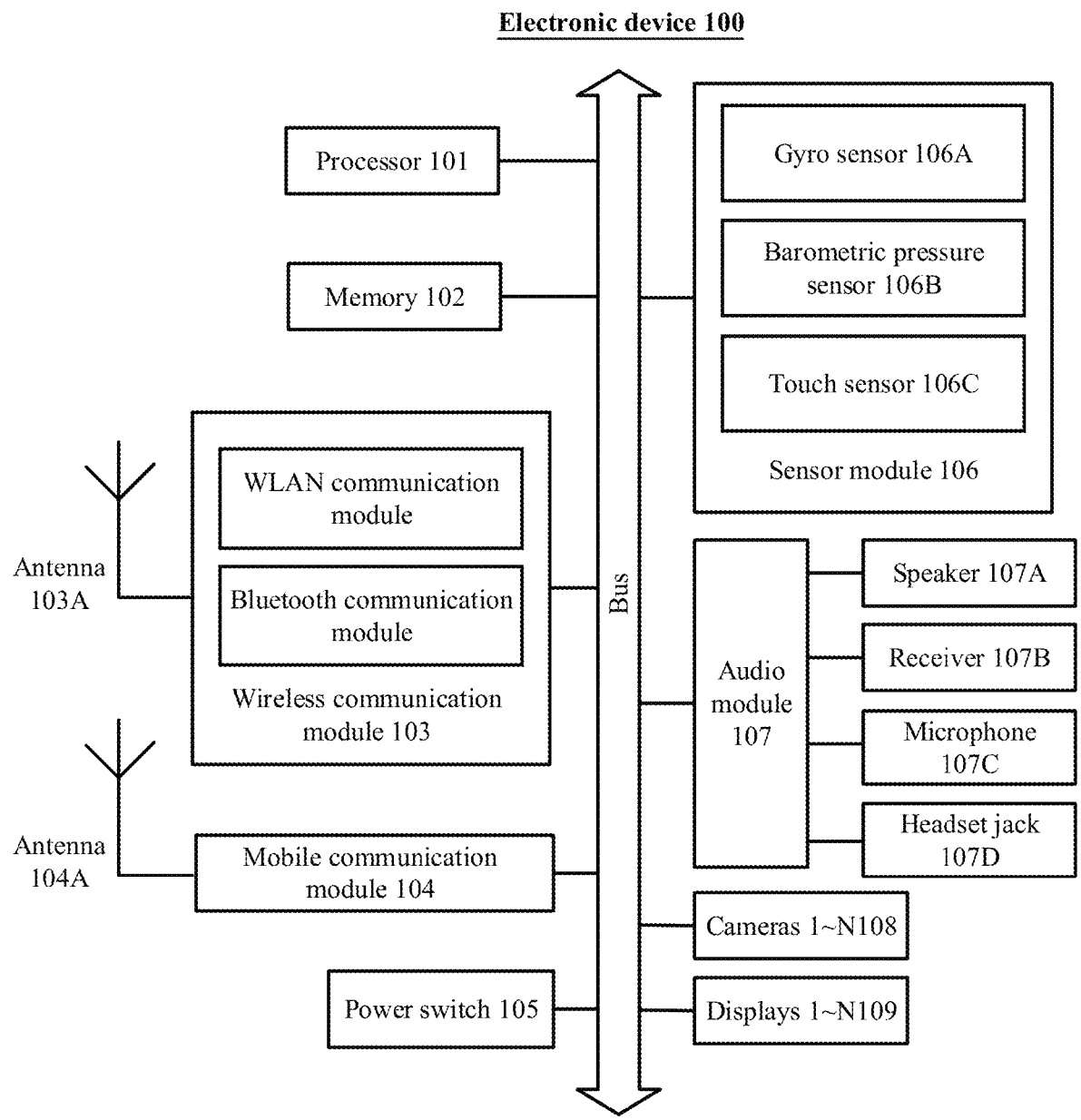
FIG. 8 is a schematic diagram of a structure of an electronic device according to an embodiment of this application.

A structure of an electronic device 100 according to an embodiment of this application is described below:

FIG. 8 shows an example of a structure of the electronic device 100 according to an embodiment of this application.

The electronic device 100 may include a processor 101, a memory 102, a wireless communication module 103, a mobile communication module 104, an antenna 103A, an antenna 104A, a power switch 105, a sensor module 106, an audio module 107, a camera 108, a display 109, and the like. The sensor module 106 may include an optical proximity sensor 106A, an ambient light sensor 106B, a touch sensor 106C, a distance sensor 106D, and the like. The wireless communication module 103 may include a WLAN communication module, a Bluetooth communication module, and the like. The plurality of parts may transmit data by using a bus.

The electronic device 100 may implement a display function by using a GPU, the display 109, an application processor, and the like. The GPU is an image processing microprocessor, which is connected to the display 109 and the application processor. The GPU is configured to perform mathematical and geometric calculations to render graphics. The processor 101 may include one or more GPUs that execute program instructions to generate or change display information.

The display 109 is configured to display an image, a video, and the like. The display 109 includes a display panel. The display panel may adopt a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flex light-emitting diode (flex light-emitting diode, FLED), a Miniled, a MicroLed, a Micro-oLed, quantum dot light emitting diodes (quantum dot light emitting diodes, QLED), or the like. In some embodiments, the electronic device 100 may include one or N displays 109, where N is a positive integer greater than 1.

It can be understood that the structure illustrated in this embodiment of this application does not constitute a specific limitation on the electronic device 100. In some other embodiments of this application, the electronic device 100 may include more or fewer components than those shown in the figure, or combine some components, or split some components, or have different component arrangements. The illustrated components may be implemented by using hardware, software, or a combination of software and hardware.

Figure 9:
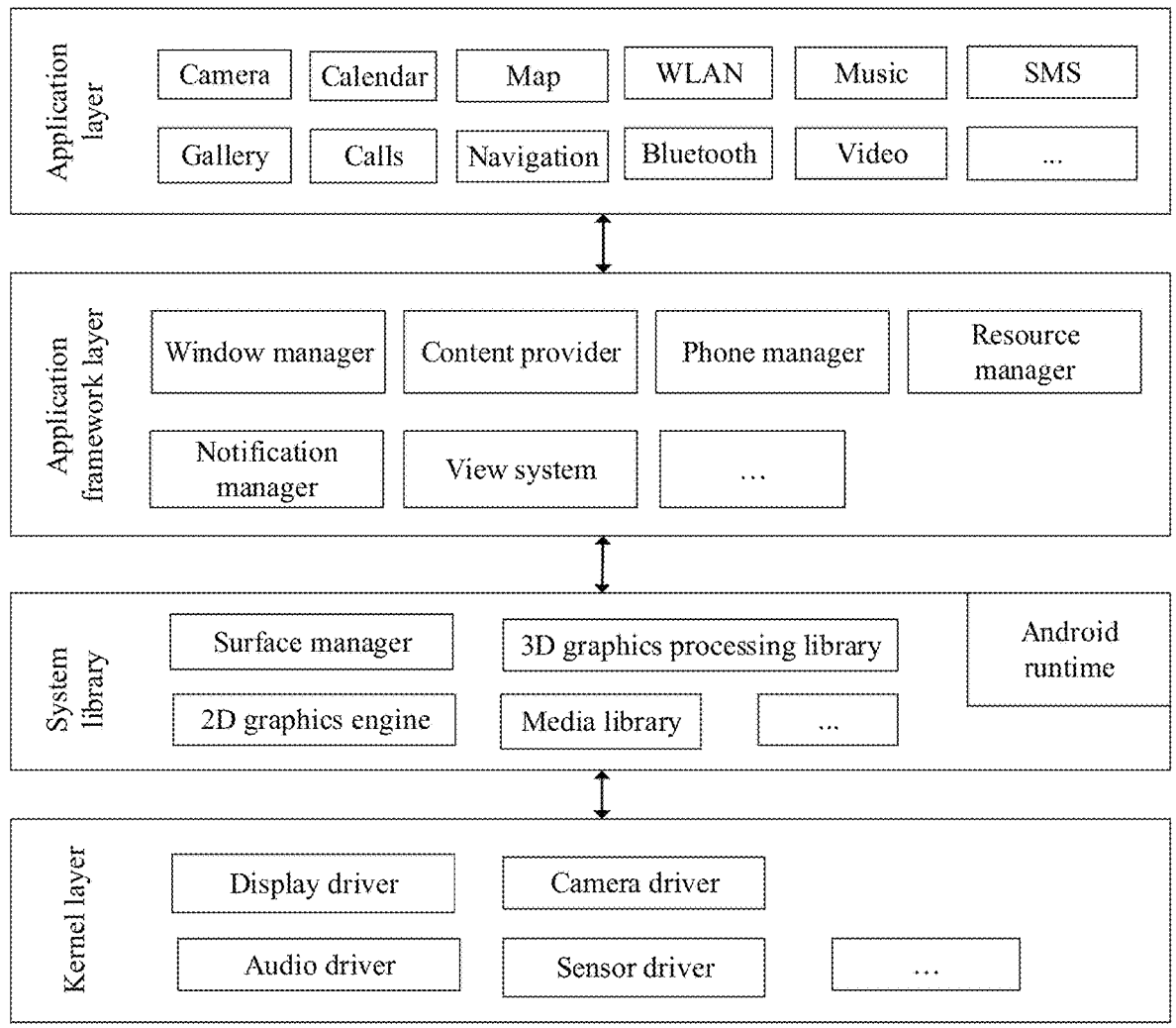
FIG. 9 is a schematic diagram of a software architecture of an electronic device according to an embodiment of this application.

A software architecture of the electronic device 100 according to an embodiment of this application is described below:

FIG. 9 shows an example of the software architecture of the electronic device 100 according to an embodiment of this application.

As shown in FIG. 9, a software system of the electronic device 100 may use a hierarchical architecture, an event-driven architecture, a microkernel architecture, a microservice architecture, or a cloud architecture. In this embodiment of this application, a software structure of the electronic device 100 is described by using an example of an Android system with a hierarchical architecture.

The hierarchical architecture divides software into layers, and each layer has a clear function and division of labor. The layers communicate with each other by using a software interface. In some embodiments, the Android system is divided into four layers: an application layer, an application framework layer, an Android runtime (Android runtime) and a system library layer, and a kernel layer from top down.

The application layer may include a series of application packages.

As shown in FIG. 9, the application packages may include applications such as camera, gallery, setting, call, map, navigation, WLAN, Bluetooth, music, video, and SMS.

The application framework layer provides an application programming interface (application programming interface, API) and a programming framework for applications at the application layer. The application framework layer includes some predefined functions.

As shown in FIG. 9, the application framework layer may include a window manager, a content provider, a view system, a phone manager, a resource manager, a notification manager, and the like.

The window manager is used to manage a window program. The window manager may obtain a size of a display, determine whether there is a status bar, lock a screen, take a screenshot, and the like.

The content provider is used to store and obtain data and enable the data to be accessible to an application. The data may include videos, images, audios, calls made and received, browsing histories and bookmarks, phone books, and the like.

The view system includes a visual control, such as a control for displaying a text, or a control for displaying a picture. The view system may be used to build an application. A display interface may include one or more views. For example, a display interface including an SMS message notification icon may include a view for displaying a text and a view for displaying a picture.

The phone manager is used to provide a communication function of the electronic device 100, for example, management of a call state (answering or declining).

The resource manager provides various resources for applications, such as localized strings, icons, pictures, layout files, and video files.

The notification manager enables an application to display notification information in a status bar, and may be used to convey a message of a notification type, and the message may automatically disappear after a quick stop, without a user interaction. For example, the notification manager is used for notifying download completion or as a message reminder. The notification manager may alternatively be a notification that appears in the status bar at the top of the system in a form of a chart or a scroll bar text, for example, a notification for an application running in the background, or a notification that appears on a screen in a form of a dialog window. For example, text information is displayed in the status bar, a prompt tone is made, a terminal device is vibrating, and an indicator light is flashing.

The Android runtime includes a core library and a virtual machine. The Android runtime is responsible for scheduling and management of the Android system.

The core library includes two parts: one part is function functions that the java language needs to invoke, and the other part is the core library of Android.

The application layer and the application framework layer run on the virtual machine. The virtual machine executes java files at the application layer and the application framework layer as binary files. The virtual machine is used to perform functions such as lifecycle management of an execution object, stack management, thread management, security and exception management, and garbage collection.

The system library may include a plurality of functional modules, such as a surface manager (surface manager), media libraries (Media Libraries), a 3D graphics processing library (for example, an OpenGL ES), and a 2D graphics engine (for example, an SGL).

The surface manager is used to manage a display subsystem, and provide fusion of 2D and 3D layers for a plurality of applications.

The media libraries support a plurality of common audio and video formats for play back and recording, still image files, and the like. The media libraries may support a plurality of audio and video encoding formats, such as MPEG4, H.264, MP3, AAC, AMR, JPG, and PNG.

The 3D graphics processing library is used to implement 3D graphics drawing, image rendering, synthesis, and layer processing.

The 2D graphics engine is a drawing engine for 2D graphics.

The kernel layer is a layer between hardware and software. The kernel layer includes at least a display driver, a camera driver, an audio driver, and a sensor driver.

A working procedure of software and hardware of the electronic device 100 is described below as an example with reference to a capture photographing scenario.

When the touch sensor 106C receives a touch operation, a corresponding hardware interrupt is sent to the kernel layer. The kernel layer processes the touch operation into an original input event (including touch coordinates, a timestamp of the touch operation, and other information). The original input event is stored at the kernel layer. The application framework layer obtains the original input event from the kernel layer, and identifies a control corresponding to the input event. For example, the touch operation is a touch tap operation, and a control corresponding to the tap operation is a control of a camera application icon. A camera application invokes an interface of the application framework layer to start the camera application, so that the kernel layer is invoked to start a camera driver, and the camera 193 captures a static image or video.

Figure 10:
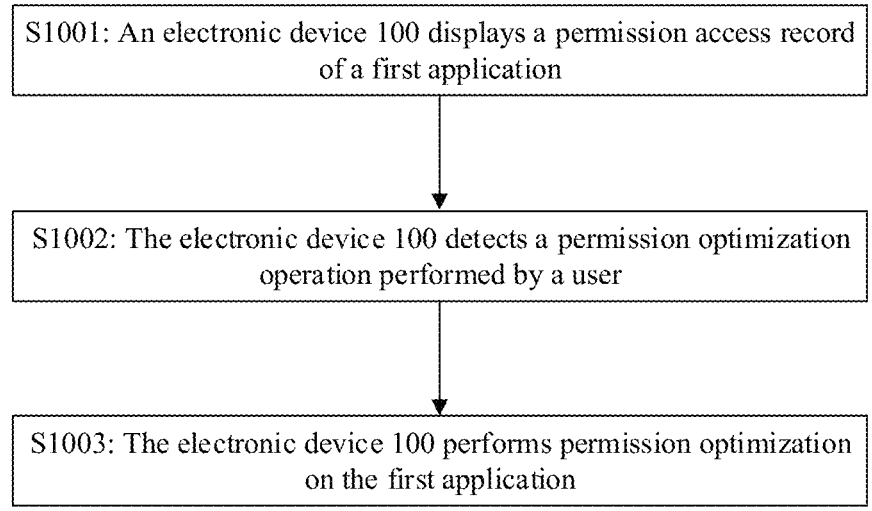
FIG. 10 is a schematic flowchart of a permission optimization method according to an embodiment of this application.

With reference to the series of user interfaces, a procedure of a permission optimization method according to an embodiment of this application is described below:

FIG. 10 shows an example of a procedure of a permission optimization method according to an embodiment of this application.

The method may include the following steps.

S1001: The electronic device 100 displays a permission access record of a first application.

For example, the first application may be the life service application, and the permission access record of the first application may be the location permission access record of the first application shown in FIG. 2B. In addition, the first application may also be another application, and the permission access record of the first application may also be an access record of another permission (for example, a camera permission or an address book permission).

The permission access record of the first application may include an access record in which a privacy risk exists. The access record in which a privacy risk exists may include one or more of the following: a record in which the first application uses a permission (also referred to as a first permission) corresponding to a specific function when the specific function of the first application is disabled, and a record in which the first application uses a permission (also referred to as a second permission) that does not match a permission allowed to be granted to the first application in a preset rule.

For a specific process of triggering the electronic device 100 to display the permission access record of the first application, refer to the text descriptions of FIG. 1A, FIG. 1B, and FIG. 2A. Details are not described herein again.

S1002: The electronic device 100 detects a permission optimization operation performed by the user.

For example, the permission optimization operation performed by the user may include a first operation and a second operation. The first operation may be an operation performed by the user on an access record in which a privacy risk exists (for example, as shown in FIG. 2B, an operation performed by the user on the location permission access record 221). The second operation may be an operation performed by the user on the "immediate optimization" option 232 (also referred to as a first option) displayed on the pop-up interface 230 (also referred to as a first window) shown in FIG. 2C.

For specific content, refer to the text descriptions of FIG. 2B and FIG. 2C. Details are not described herein again.

The permission optimization operations mentioned above are not limited to interaction forms shown in FIG. 2B and FIG. 2C, and may further be another interaction form, such as a voice instruction or a gesture.

S1003: The electronic device 100 performs permission optimization on the first application.

For example, after detecting the permission optimization operation of the user, the electronic device 100 may perform permission optimization on the first application. Specifically, the electronic device 100 allows the first application to use a permission corresponding to a specific function only when the specific function of the first application is enabled. The electronic device 100 prohibits the first application from using a permission that does not match a permission allowed to be granted to the first application in a preset rule.

It can be learned that the permission optimization method provided in FIG. 10 can enable the electronic device 100 to perform permission optimization, thereby reducing user privacy disclosure and improving user experience.

Figure 11:
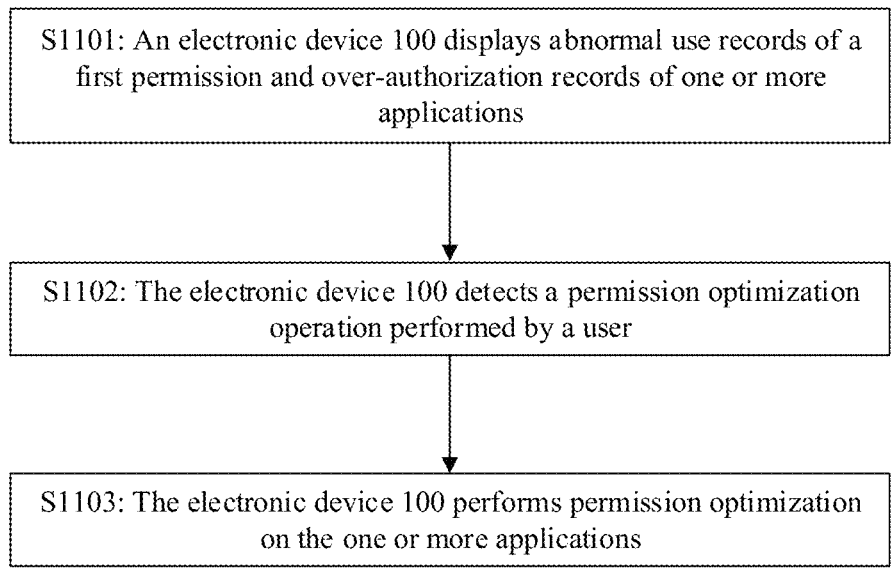
FIG. 11 is a schematic flowchart of another permission optimization method according to an embodiment of this application.

FIG. 11 shows an example of a procedure of another permission optimization method according to an embodiment of this application.

The method may include the following steps.

S1101: The electronic device 100 displays abnormal use records of a first permission and over-authorization records of one or more applications.

For example, the abnormal use record of the first permission may be an abnormal use record of the location permission (that is, the location permission information option 421) shown in FIG. 4B, and the over-authorization record may be an over-authorization record (that is, the over-authorization option 422) shown in FIG. 4B.

The abnormal use record of the first permission is merely used as an example of the abnormal use record of the location permission, which does not constitute a limitation. The abnormal use record of the first permission may further be an abnormal access record of another permission (for example, a camera permission or an address book permission).

The abnormal use record of the first permission includes a record in which the first permission is used by the one or more applications when a specific function of the one or more applications is disabled. The first permission is a permission corresponding to the specific function. The over-authorization record includes a record in which the one or more applications are granted a second permission. The second permission is not a permission allowed to be granted to the one or more applications (that is, the second permission is a permission that does not match a permission allowed to be granted to an application in a preset rule).

S1102: The electronic device 100 detects a permission optimization operation performed by the user.

In a possible implementation, the permission optimization operation performed by the user may be an operation performed by the user on the "one-tap optimization" option 423 (also referred to as a fourth option) shown in FIG. 4B.

In another possible implementation, the permission optimization operation performed by the user may include a third operation and a fourth operation. The third operation may include an operation performed by the user on the abnormal use record of the first permission (for example, an operation performed by the user on the location permission information option 421 shown in FIG. 4B) and an operation performed by the user for modifying the first permission. For the operation performed by the user for modifying the first permission, refer to text descriptions of FIG. 5A-FIG. 5B. Details are not described herein again. The fourth operation may include an operation performed by the user on the over-authorization record (for example, an operation performed by the user on the over-authorization option 422 shown in FIG. 4B) and an operation performed by the user for modifying the second permission. For the operation performed by the user for modifying the second permission, refer to text descriptions of FIG. 6A-FIG. 6D. Details are not described herein again.

The permission optimization operations mentioned above are not limited to interaction forms shown in FIG. 4B, FIG. 5A-FIG. 5B, and FIG. 6A-FIG. 6D, and may further be another interaction form, such as a voice instruction or a gesture.

S1103: The electronic device 100 performs permission optimization on the one or more applications.

For example, after detecting the permission optimization operation of the user, the electronic device 100 may perform permission optimization on the one or more applications. Specifically, the electronic device 100 allows the one or more applications to use the first permission only when a specific function of the one or more applications is enabled. The electronic device 100 prohibits the one or more applications from using the second permission.

It can be learned that the permission optimization method provided in FIG. 11 can enable the electronic device 100 to perform permission optimization, thereby reducing user privacy disclosure and improving user experience.

In this embodiment of this application, the first user interface may be the user interface shown in FIG. 2A: the second option may be the all-privacy access record option shown in FIG. 2A: the second user interface may be the user interface shown in FIG. 3A, FIG. 3B, or FIG. 3F; the third user interface may be the user interface shown in FIG. 3C: the third option may be the drop-down option 321: the first prompt information may be the security prompt information displayed on the pop-up interface 140: the fourth user interface may be the user interface shown in FIG. 4B; and the second prompt information may be the icon 431 shown in FIG. 4C.

The foregoing embodiments may be completely or partially implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (such as a coaxial cable, an optical fiber, or a digital subscriber line) manner or a wireless (such as infrared, wireless, or microwave) manner. The computer-readable storage medium may be any available medium accessible by a computer or a data storage device such as a server or a data center that integrates one or more available media. The available medium may be a magnetic medium (such as a floppy disk, a hard disk, or a magnetic tape), an optical medium (such as a DVD), a semiconductor medium (such as a solid state disk (solid state disk, SSD)), or the like.

Persons of ordinary skill in the art may understand that all or some of the procedures in the methods in the foregoing embodiments are implemented, and the procedures may be implemented by a computer program instructing related hardware. The program may be stored in a computer-readable storage medium. When the program is executed, the procedures in the methods in the foregoing embodiments may be included. The foregoing storage medium includes various media that can store program code, such as a ROM or a random-access memory RAM, and a magnetic disk or a compact disc.

The foregoing embodiments are only used to illustrate the technical solutions of embodiments of this application, but are not used to limit this application. Although embodiments of this application has been described in detail with reference to the foregoing embodiments, it should be understood by a person of ordinary skill in the art that the technical solutions described in the foregoing embodiments may still be modified, or some or all technical features thereof are equivalently replaced. These modifications or replacements do not make the essence of the corresponding technical solutions depart from the scope of the technical solutions of embodiments of this application.

What is claimed is:

1. A permission optimization method, applied to an electronic device, wherein the method comprises:

displaying, by the electronic device, a first permission access record interface, wherein the first permission access record interface comprises a first permission access record of a first application, the first permission access record comprises first access record, the first access record indicates that a privacy risk exists, and the first access record comprises a record of a total quantity of times over a time period in which a first permission was used by the first application when a specific function of the first application was disabled;

detecting, by the electronic device, a first operation performed by a user on the first permission access record of the first permission access record interface, and displaying a first pop-up interface, wherein the first pop-up interface comprises prompt information and a permission optimization option that is associated with limiting use of the first permission by the first application, based at least on the specific function, and the prompt information displays to is used to remind the user that a risk exists in the first permission of the first application;

detecting, by the electronic device, a permission optimization operation performed by the user on the permission optimization option which indicates to limit the use of the first permission by the first application based on the specific function;

in response to detecting the permission optimization operation, allowing, by the electronic device, the first application to use the first permission only when the specific function is enabled;

displaying, by the electronic device, a second permission access record interface, wherein the second permission access record interface comprises the first permission access record obtained after the permission optimization operation is performed, the first permission access record comprises the first access record, the first access record indicates that no privacy risk exists, and the second permission access record interface is different from the first permission access record interface; and detecting, by the electronic device, a second operation performed by the user on the first permission access record of the second permission access record interface, and displaying a second pop-up interface, wherein the second pop-up interface is different from the first pop-up interface.

2. The method according to claim 1, wherein the first permission access record interface further comprises a second access record, the second access record indicates that no privacy risk exists; wherein before the electronic device detects the permission optimization operation of the user, a display manner of the second access record is different from a display manner of the first access record; and after the electronic device detects the permission optimization operation of the user, a display manner of the second access record is the same as a display manner of the first access record.

3. The method according to claim 1, wherein before the displaying, by the electronic device, the first permission access record interface, the method further comprises:

displaying, by the electronic device, a first user interface, wherein the first user interface comprises one or more permission options and one or more application options, the one or more permission options are used by the user to view an application that has used a permission, the one or more application options are used by a user to view an access record of the permission corresponding to the application, and the one or more application options comprise a first application option; and detecting, by the electronic device, a third operation performed by the user on the first application option.

4. The method according to claim 1, wherein the detecting, by the electronic device, a permission optimization operation performed by the user on the permission optimization option comprises:

detecting a first input performed by the user on the first access record, the first access record indicates that the privacy risk exists; and detecting a second input performed by the user on a first option that is displayed on a first window, wherein the first window is displayed after detecting the first input.

5. The method according to claim 3, wherein the first user interface further comprises a second option, and the method further comprises:

detecting, by the electronic device, third input performed by the user on the second option, and displaying, by the electronic device, a second user interface, wherein the second user interface comprises all privacy access records, and all the privacy access records comprise records in which one or more applications have used or attempted to use one or more permissions.

6. The method according to claim 5, wherein all the privacy access records are distinctively displayed on the second user interface in chronological order.

7. The method according to claim 5, wherein all the privacy access records are distinctively displayed on the second user interface based on a permission name or an application name.

8. The method according to claim 7, wherein the method further comprises:

detecting, by the electronic device, a fourth operation performed by the user for viewing a privacy access record of the first application, and displaying, by the electronic device, a third user interface, wherein the third user interface comprises a third option, and the third option is used by the user to view complete or partial permission access records of the first application.

9. The method according to claim 1, wherein the method further comprises:

displaying, by the electronic device, first prompt information, wherein the first prompt information is used to remind a user to view the permission access record.

10. The method according to claim 1, wherein the first access record further comprises a record in which a second permission was used by the first application, and the granting of the second permission to the first application is against a preset rule.

11. The method according to claim 10, further comprising: prohibiting the first application from using the second permission.

12. The method according to claim 1, wherein the second pop-up interface comprises a switch option used to set a precise location, and after the switch option is selected, the first application displays a specific location of the user, or when the switch option is not selected, the first application displays an approximate location of the user.

13. A permission optimization method, applied to an electronic device, wherein the method comprises:

displaying, by the electronic device, a fourth user interface, wherein the fourth user interface comprises an abnormal use record of a first permission and an over-authorization record, the abnormal use record of the first permission comprises a record of a total quantity of times over a time period in which the first permission was used by one or more applications when a specific function of the one or more applications was disabled, the over-authorization record comprises a record in which the one or more applications are granted a second permission, and the granting of the second permission to the one or more applications is against a preset rule, and the fourth user interface comprises prompt information and a permission optimization option that is associated with limiting use of the first permission by the one or more applications, based at least on the specific function, wherein the prompt information displays to a user that a risk exists in the first permission and the second permission that are of the one or more applications;

detecting, by the electronic device, a permission optimization operation performed by the user on the permission optimization option which indicates to limit the use of the first permission by the one or more applications based on the specific function;

in response to detecting the permission optimization operation, allowing, by the electronic device, the one or more applications to use the first permission only when the specific function of the one or more applications is enabled, and prohibiting, by the electronic device, the one or more applications from using the second permission; and displaying, by the electronic device, a fifth user interface, wherein the fifth user interface comprises an interface obtained after the permission optimization operation is performed, the fifth user interface comprises an access record in which no privacy risk exists, and the fifth user interface is different from the fourth user interface.

14. The method according to claim 13, wherein before the displaying, by the electronic device, a fourth user interface, the method further comprises:

determining, by the electronic device, that the one or more applications abnormally use the first permission; and determining, by the electronic device, that the one or more applications are over-authorized.

15. The method according to claim 14, wherein the determining, by the electronic device, that the one or more applications abnormally use the first permission comprises:
   detecting, by the electronic device, that the total quantity of times that the one or more applications used the first permission to obtain user privacy information within first preset time period exceeds a first preset threshold; or,
   detecting, by the electronic device, that the one or more applications used the first permission when the specific function is disabled.

16. The method according to claim 14, wherein the determining, by the electronic device, that the one or more applications are over-authorized comprises:
   detecting, by the electronic device, that the one or more applications are granted the second permission; and
   determining, by the electronic device, that the second permission is not allowed to be granted to the one or more applications according to the preset rule.

17. The method according to claim 13, wherein the fourth user interface further comprises a fourth option, and the detecting, by the electronic device, the permission optimization operation performed by the user on the permission optimization option specifically comprises:
   detecting, by the electronic device, an operation performed by the user on the fourth option.

18. The method according to claim 13, wherein the detecting, by the electronic device, a permission optimization operation performed by the user on the permission optimization option comprises:
   detecting a third operation performed by the user on the abnormal use record of the first permission and detecting an operation performed by the user that modifies the first permission; and
   detecting a fourth input performed by the user on the over-authorization record and an operation performed by the user that modifies the second permission.

19. The method according to claim 13, wherein the method further comprises:
   displaying, by the electronic device, second prompt information, wherein the second prompt information displays to the user that the electronic device has completed permission optimization.

20. An electronic device, wherein the electronic device comprises one or more processors and one or more memories, the one or more memories are coupled to the one or more processors, the one or more memories are configured to store computer program code, and the computer program code comprises computer instructions; and when the one or more processors execute the computer instructions, the electronic device is enabled to perform a method, the method comprising:
   displaying a first permission access record interface, wherein the first permission access record interface comprises a first permission access record of a first application, the first permission access record comprises first access record, the first access record indicates that a privacy risk exists, and the first access record comprises a record of a total quantity of times over a time period in which a first permission was used by the first application during when a specific function of the first application was disabled;
   detecting a first operation performed by a user on the first permission access record of the first permission access record interface, and displaying a first pop-up interface, wherein the first pop-up interface comprises prompt information and a permission optimization option that is associated with limiting use of the first permission by the first application, based at least on the specific function, and the prompt information displays to the user that a risk exists in the first permission of the first application;
   detecting a permission optimization operation performed by the user on the permission optimization option which indicates to limit the use of the first permission by the first application based on the specific function;
   in response to detecting the permission optimization operation, allowing the first application to use the first permission only when the specific function is enabled;
   displaying a second permission access record interface, wherein the second permission access record interface comprises the first permission access record obtained after the permission optimization operation is performed, the first permission access record comprises the first access record, the first access record indicates that no privacy risk exists, and the second permission access record interface is different from the first permission access record interface; and
   detecting a second operation performed by the user on the first permission access record of the second permission access record interface, and displaying a second pop-up interface, wherein the second pop-up interface is different from the first pop-up interface.

* * * * *